United States Patent
Ogawa

(10) Patent No.: US 7,622,013 B2
(45) Date of Patent: Nov. 24, 2009

(54) TIRE MANUFACTURING METHOD, COVER RUBBER STAMPING DEVICE USED THEREFORE, TIRE, AS WELL AS RUBBER SHEET MEMBER STAMPING METHOD, AND DEVICE

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 581 days.

(21) Appl. No.: 10/532,315

(22) PCT Filed: Oct. 23, 2003

(86) PCT No.: PCT/JP03/13562

§ 371 (c)(1),
(2), (4) Date: Apr. 22, 2005

(87) PCT Pub. No.: WO2004/037524

PCT Pub. Date: May 6, 2004

(65) Prior Publication Data

US 2006/0048878 A1   Mar. 9, 2006

(30) Foreign Application Priority Data

Oct. 23, 2002   (JP) ............................. 2002-308695

(51) Int. Cl.
*B29D 30/06* (2006.01)
*B29D 30/72* (2006.01)
*B60C 13/00* (2006.01)
*B60C 13/04* (2006.01)

(52) U.S. Cl. .................... 156/116; 156/110.1; 152/523; 152/524; 152/525

(58) Field of Classification Search ................. 152/525, 152/110.1; 156/116
See application file for complete search history.

(56) References Cited

U.S. PATENT DOCUMENTS

| 3,769,123 A | 10/1973 | Botts et al. |
| 4,177,233 A | 12/1979 | Roberts, Jr. |
| 4,222,810 A | 9/1980 | Ytterstrom |
| 4,768,939 A | 9/1988 | Bourcier et al. |

(Continued)

FOREIGN PATENT DOCUMENTS

EP   1 201 414 A2   5/2002

(Continued)

*Primary Examiner*—Justin Fischer
(74) *Attorney, Agent, or Firm*—Oliff & Berridge, PLC

(57) ABSTRACT

A method of manufacturing a tire having first color characters or lines on at least one side wall part, includes the steps of stamping a second color side wall rubber and a first color side wall rubber on the side face of a carcass member formed in a toroidal shape by winding, a plurality of turns, a continuous second color rubber ribbon and a continuous first color rubber ribbon thereon, stamping a second color cover rubber on the outsides of the side wall rubbers by winding a rubber sheet whereon one turn in an annular shape, and molding a green tire, whereby the use of a large extrude can be eliminated, different types of tires can be efficiently manufactured since a size switching can be easily performed, the accuracies of the shape and the dimensions of the members thereof can be increased, the uniformity and the tire balance thereof can be increased, and the sharp profile of the first color characters or lines can be assumed, thus eliminating problems associated with the appearance.

5 Claims, 19 Drawing Sheets

U.S. PATENT DOCUMENTS

| | | | |
|---|---|---|---|
| 4,963,207 A | 10/1990 | Laurent | |
| 5,263,525 A | 11/1993 | Yamashita | |
| 5,277,742 A | 1/1994 | Scheurer | |
| 2002/0074077 A1 * | 6/2002 | Ikeda et al. | 156/123 |
| 2002/0088529 A1 | 7/2002 | Ogawa et al. | |

FOREIGN PATENT DOCUMENTS

| | | | |
|---|---|---|---|
| GB | 1 017 464 | | 1/1966 |
| JP | A 54-80 | | 1/1979 |
| JP | 4-275136 | * | 9/1992 |
| JP | A 5-8612 | | 1/1993 |
| JP | 9-1694 | * | 1/1997 |
| JP | 09-254274 | | 9/1997 |
| JP | A 10-291261 | | 11/1998 |
| JP | A 2001-179849 | | 5/2001 |
| JP | A 2001-179849 | | 7/2001 |
| JP | 2002-79590 | * | 3/2002 |
| JP | A 2002-200677 | | 7/2002 |

* cited by examiner

TIRE MANUFACTURING METHOD, COVER RUBBER STAMPING DEVICE USED THEREFORE, TIRE, AS WELL AS RUBBER SHEET MEMBER STAMPING METHOD, AND DEVICE

FIELD OF THE INVENTION

The present invention relates to a tire having characters or lines in color different from the surroundings on a side wall part, its manufacturing method and a device used for the manufacturing method and particularly to efficient manufacturing of a high-quality tire with sharp profiles of characters or lines and furthermore to a method and an apparatus for stamping a rubber sheet member.

BACKGROUND ART

A method for manufacturing a tire is proposed in which a green tire is shaped by stamping each of tire-constitutional members on the outside of a toroidal-shape carcass member fixed onto a rigid core or a shaping drum and vulcanizing it in order to make the shape of a product tire or dimensions of each of the members highly accurate. In this manufacturing method, a rubber member among these tire-constitutional members is stamped by winding a continuous rubber ribbon in plural turns, and according to this manufacturing method, when compared with the case where a rubber having a cross section corresponding to a cross section of a member in the product tire is wound only once for formation, there is no need to extrude a rubber member with a large cross-section which can reduce the size of an extruder and moreover, by directly winding a rubber ribbon extruded from a smaller-sized extruder onto a toroidal-shape carcass member, the need of a large amount of an intermediate stock of members which has been necessary for production of other types of tires can be eliminated.

Also, when shaping green tires in different sizes, members with different cross sections can be formed with a rubber ribbon in the same cross sectional shape only by changing the number of times or position of winding and it has a feature that green tires in difference sizes can be formed continuously.

Moreover, the tire made of the rubber member formed by winding the rubber ribbon in plural turns in this way becomes high quality in the uniformity and tire balance, since there is no joint across the total width of each member.

However, it has been found out that the following problem may occur if this manufacturing method is applied to a tire having characters or lines different in color from the surroundings on the side wall part.

FIG. 1 is a perspective view showing a portion of a side wall part of a product tire on which the character "I" is formed in white, for example. FIG. 2 is a sectional view corresponding to II-II arrow view in FIG. 1 showing the state in the middle of manufacture of the tire portion where this character is formed, and FIGS. 3(a) and 3(b) are a sectional view and a perspective view showing the detail of this character portion in the product tire. In FIG. 1, B indicates a black rubber portion and W for a white rubber portion, and in FIGS. 1 to 3(a) and 3(b), T is an arrow showing the circumferential direction of the tire. The a-a arrow view in FIG. 3(b) corresponds with the cross section of FIG. 3(a).

In order to form this white character, as shown in FIG. 2(a), at the stage to shape a green tire, after a black side wall rubber 92 is stamped on the outside of a carcass member 91 to be a base, a black cover rubber 93 is stamped on a side wall part on which the white character is to be expressed. And in vulcanizing this green tire, as shown in FIG. 2(b), the white character portion is projected from the other portions using a mold with a recess portion corresponding to the white character.

Then, as shown in FIG. 3(a), the projected portion is buffed to remove the cover rubber 93, and the white side wall rubber 92 appears from under it and the white character can be formed. However, if the cover rubber 93 is formed by overlapping a narrow-width ribbon, as shown in FIG. 3(b), a step between the ribbons appears on a cross section 93a in which the over-lapping portion between the ribbons is buffed, which causes a problem on appearance. Even if the ribbon is wound so that a gap between the ribbons becomes zero in order to solve the problem, it is actually difficult to bring this gap to zero, and a gap or overlapping will occur and the problem on appearance has not been solved yet.

The present invention has been made in view of the above problem and has an object to provide a tire having characters or lines in color different from the surroundings on a side wall part, a manufacturing method in which a large extruder is not needed, the other types of tires can be efficiently manufactured since size switching is easy, the shape and the dimensions of the members are highly accurate, the uniformity and the tire balance are excellent and a tire with sharp profiles of characters or lines and having no problem on appearance, a tire manufactured with the manufacturing method and a device used in this manufacturing method.

DESCRIPTION OF THE INVENTION

The present invention was made in order to achieve the above object, and its gist, constitution and action will be described below.

(1) The present invention provides a method of manufacturing a tire having, on at least one side wall, a first color side wall rubber expressed as characters or lines, second color side wall rubbers, each of which is located on both sides in the radial direction of this first color side wall rubber, and a second color cover rubber covering the first color side wall rubber portion other than the characters or lines, wherein:

each of the second color side wall rubber and the first color side wall rubber is stamped on the side face of a carcass member formed in the toroidal-shape by winding a continuous second color rubber ribbon and a continuous first color rubber ribbon in plural turns and then, said cover rubber is stamped on the outside of these side wall rubbers by winding a rubber sheet in one turn in the annular state so as to shape a green tire, and in vulcanizing the green tire, using a mold having a recess portion corresponding to the characters or lines, a projecting portion corresponding this recess portion is formed on the tire, and after vulcanization, the projecting portion on the tire is buffed to have the first color characters or lines to be expressed.

Here, the "second color" means a color to be the base color of the tire and normally black, while the "first color" means a color used as decoration of characters or lines in contrast with the "second color" and white is widely used as the "first color."

According to the present invention, since the side wall rubbers are stamped on the side face of the toroidally formed carcass member by winding the rubber ribbon in plural turns, a large extruder for extruding the side wall rubber is not needed, size switching is easy, the other types of tires can be efficiently manufactured, and moreover, a tire with highly accurate shape and dimensions of each member and excellent uniformity and tire balance can be manufactured. And also, since the cover rubber is stamped by winding the rubber sheet in one turn, a zigzag step on the profiles of the first color characters or lines which would appear if this is formed by winding the rubber ribbon in plural turns can be eliminated so that the profiles are made sharp and the problem on appearance can be prevented. Since the cover rubber is a thin member and such a rubber member that one with the same cross section can be used for the tire of another size, in the point that a large-sized extruder is not needed, and that many types of tires can be manufactured efficiently, there is no difference from the case where this is formed by winding the rubber ribbon in plural turns.

(2) The present invention further provides a method of manufacturing a tire according to item (1), wherein the leading end of a long rubber sheet arranged on a tangent of an annular band on the side wall rubber to be a stamping face of said cover rubber is held, and this leading end is moved and pressed onto the annular band and then, the rubber sheet is stamped onto the annular band by rotating the carcass member around its central axis while applying a tension to this rubber sheet, the rotation of the carcass member is stopped and then, an unstamped portion of the long rubber sheet is cut off and the unstamped portion to be the rear end of the rubber sheet on the annular band is pressed onto the annular band so as to stamp the cover rubber.

According to this aspect of the present invention, since the cover rubber is stamped by rotating the carcass member around its central axis, a large stamping apparatus is not needed but stamping can be carried out easily, and in rotating the carcass member, a tension is applied to the rubber sheet and no wrinkle is generated on the stamped cover rubber.

(3) The present invention further provides a method of manufacturing a tire according to item (2), wherein, in cutting the long rubber sheet extending on said tangent to form the leading end and the rear end of said rubber sheet, both the cut-off faces of the leading end and the rear end of the rubber sheet are inclined with respect to the width direction of the long sheet, and the long rubber sheet is cut off so that, in the cut-off face of the rubber sheet leading end, the end in the width direction to be the outside in the radial direction on the annular band is located closer to the front in the traveling direction of the long sheet than the end in the width direction to be the inside in the radial direction, while in the cut-off face of the rubber sheet rear end, the end in the width direction to be the outside in the radial direction on the annular band is located closer to the rear in the traveling direction of the long sheet than the end in the width direction to be the inside in the radial direction, and a rubber sheet portion in the shape of a trapezoid or a triangle defined by the cut-off face of the rear end of the rubber sheet stamped first and the cut-off face of the leading end of the rubber sheet to be stamped next is removed.

According to this aspect of the present invention, the long rubber sheet is cut off so that, in the cut-off face of the rubber-sheet leading end, the end in the width direction to be the outside in the radial diction on the annular band is located closer to the front in the traveling direction of the long sheet than the end in the width direction to be the inside in the radial direction and in the cut-off face of the rubber sheet rear end, the end in the width direction to be the outside in the radial direction on the annular band is located closer to the rear in the traveling direction of the long sheet than the end in the width direction to be the inside in the radial direction, and as will be described in detail later, the rubber sheet can be arranged with its leading end and terminating end in parallel with each other when stamped on the annular band, and as a result, the rubber-sheet overlapping portion between the leading end and the terminating end can be minimized both in inside and outside in the radial direction, which contributes to improvement of tire unbalance.

(4) The present invention further provides a method of manufacturing a tire according to item (1), wherein, in stamping said cover rubber onto the annular band on the side wall to be the stamping face, the rubber sheet extruded through a die is passed through a gap formed by arranging large-diameter sides and small-diameter sides of a pair of truncated conical rollers opposite to each other and rolled, and immediately after rolling of this rubber sheet, the rubber sheet is stamped in the annular state so that the rubber sheet side rolled by the large-diameter truncated conical roller is made to correspond with the outside in the radial direction of the annular band while the side rolled by the small-diameter truncated conical roller is made to correspond with the inside in the annular band.

According to this aspect of the present invention, since the rubber sheet side rolled by the large-diameter side of truncated conical roller is made to correspond with the outside in the radial direction of the annular band, while the side rolled by the small-diameter side of truncated conical roller is made to correspond with the inside in the radial direction of the annular band, respectively, expansion and contraction of the rubber sheet when stamping it on the annular band can be minimized, and as a result, remaining stress of the rubber sheet member stamped on the side of a body of rotation can be reduced whether it is inside or outside in the radial direction, and even a wide rubber sheet can be stamped by restricting deformation during and after stamping and stabling dimensions of the rubber sheet.

(5) The present invention further provides a method of manufacturing a tire according to item (4), wherein said gap is made uniform over the width direction when rolling the rubber sheet.

According to this aspect of the present invention, since the gap between the pair of truncated conical rollers is made approximately uniform over the width direction, the rubber sheet member of the uniform thickness in the radial direction can be formed in the annular state without excessive expansion or contraction.

(6) The present invention further provides a method of manufacturing a tire according to item (4) or (5), wherein after the rolled rubber sheet is wound around one of the truncated conical rollers by a predetermined angle, the rubber sheet is transferred from this truncated conical roller to the annular band while pressing the wound rubber sheet onto the annular band.

According to this aspect of the present invention, the rolled rubber sheet can be directly transferred from the truncated conical roller to the annular band, the rolled rubber sheet can be securely stamped on the annular band and the apparatus can be simplified without requiring an exclusive pressing roller for pressing the rubber sheet onto the annular band.

(7) The present invention further provides a method of manufacturing a tire in any one of items (4) to (6), wherein the rubber sheet wound around said one of the truncated conical rollers is cut off in the width direction on this truncated conical roller.

According to this aspect of the present invention, since the rubber sheet is cut in the width direction on the truncated conical roller, the portion to be the leading end of the rubber sheet to be wound next on the side face of the annular band can be held on the truncated conical roller, and in the next winding of the rubber sheet, the leading end of the rubber sheet can be easily transferred to the annular band by pressing the portion in which the leading end of the rubber sheet is held on the truncated conical roller, and by this, the leading end portion of the rubber sheet can be accurately positioned on the annular band.

(8) The present invention further provides a cover rubber stamping device used in the method of manufacturing a tire according to item (2) or (3), comprising a rubber sheet delivery means for delivering said long rubber sheet, a tensioner for applying a tension to the delivered long rubber sheet, a leading-end holding part for holding the leading end of the long rubber sheet, a leading-end holding part displacing means for displacing this leading-end holding part back and forth between a holding start position and a holding end position, a pressing roller for pressing the rubber sheet across the leading end to the rear end onto said annular band, a rubber sheet guide mechanism for regulating an entry position of the long rubber sheet into the annular band, and a cutter for forming the leading end and the rear end of the rubber sheet by cutting said long sheet.

According to this aspect of the present invention, a cover rubber can be easily stamped by the above constitution.

(9) The present invention further provides a cover rubber stamping device according to item (8), wherein said leading end holding part is to hold the rubber sheet leading end by vacuum adsorption.

According to this aspect of the present invention, since only one face of the rubber sheet leading end is held by vacuum adsorption so as to transfer the other face to the annular band, the rubber sheet can be held at the very end, and the size of the leading end which is a non-deformed area can be minimized.

(10) The present invention further provides a cover rubber stamping device according to item (8) or (9), wherein double blades inclined in reverse orientation from each other with respect to the face crossing the long rubber sheet delivery direction are disposed on said cutter, and anvils for receiving these blades and a cutter displacing means for displacing the cutter in the direction crossing the rubber sheet face arranged on the anvil are provided, and a gap for removing a trapezoidal or triangular rubber sheet portion cut off by the double blades is arranged between these anvils.

According to this aspect of the present invention, as mentioned above, a manufacturing method which can minimize overlapping between the leading end and the rear end of the rubber sheet can be realized easily, and tire unbalance can be improved.

(11) The present invention further provides a cover rubber stamping device used in the method of manufacturing a tire according to any one of items (4) to (7), comprising an extruder for extruding the rubber sheet through a die, a rolling machine consisting of a pair of truncated conical rollers arranged with their large-diameter sides and the small-diameter sides corresponding with each other, and a cutter for cutting off the rolled rubber sheet in the width direction.

According to this aspect of the present invention, the rubber sheet member can be stamped annularly by winding a wide rubber sheet only once uniformly without expansion or contraction by the above constitution.

(12) The present invention further provides a cover rubber stamping device according to item (11), wherein said rolling machine is provided between the pair of truncated conical rollers with almost a uniform gap over the width direction.

According to this aspect of the present invention, because of the action of the uniform gap, as mentioned above, the rubber sheet member of the uniform thickness in the radial direction can be formed annularly.

(13) The present invention further provides a cover rubber stamping device according to item (11) or (12), wherein the large-diameter side of one of the truncated conical rollers is arranged opposite to the outside in the radial direction of the annular band and the small-diameter side of this roller to the inside in the radial direction of the annular band in the stamping posture of the rubber sheet onto said annular band.

According to this aspect of the present invention, as mentioned above, the rolled rubber sheet can be transferred directly from the truncated conical roller to the annular band, the rolled rubber sheet can be securely stamped onto the annular band and the device can be constituted in the simplified way without requiring an exclusive pressing roller for pressing the rubber sheet onto the annular band.

(14) The present invention further provides a cover rubber stamping device according to any one of items (11) to (13), wherein an opening of the die of the extruder is made into the slit state whose width is gradually increased from one end to the other end, and the wide side end of the opening is arranged corresponding to the large diameter side of the truncated conical roller and the narrow side end of the opening corresponding to the small diameter side of the truncated conical roller.

According to this aspect of the present invention, since the opening of the die of the extruder is made in the slit state whose width is gradually increased from one end to the other end and arranged as above, a large amount of rubber is extruded to the large diameter side of the truncated conical roller with a large rubber rolling capacity, while a small amount of rubber is extruded to the small diameter side of the truncated conical roller with a small rubber rolling capacity so that balance of the rubber amounts along the width direction of the truncated conical roller can be optimized, and the annular rubber sheet member with the more uniform layer thickness and less deformation can be formed.

(15) The present invention further provides a tire in which at least one side wall is comprised of a first color side wall rubber expressed as characters or lines, a second color side wall rubbers located on both sides in the radial direction of this first color side wall rubber, respectively, and a cover rubber in the second color covering a first-color side wall rubber portion other than the characters or lines, wherein:

the first color side wall rubbers and their second color side wall rubber are made of a continuous rubber ribbon wound in plural turns, respectively, and the cover rubber is made of a single thin annular rubber sheet.

According to this aspect of the present invention, as mentioned above, a large-sized extruder for extruding the side wall rubber is not required in its production, size switching is easy and tires of another type can be manufactured efficiently, and a tire of highly accurate shape and dimensions of each member and excellent uniformity and tire balance can be provided. Moreover, since the cover rubber is constituted by a single thin annular rubber sheet, the profiles of the first color characters or lines can be made sharp and the problem on appearance can be prevented.

(16) The present invention further provides a method of stamping a rubber sheet member in the annular state on a side face of a body of rotation, wherein:

a leading end of a long rubber sheet arranged on a tangent of an annular band on the side face of the body of rotation to be a stamping face of the rubber sheet member is held, and the leading end is transferred onto the annular band and pressed and then, the rubber sheet is stamped onto the annular band by rotating the body of rotation around its central axis while applying a tension to this rubber sheet, after the rotation of the body of rotation is stopped, an unstamped portion of the long rubber sheet is cut off, and the unstamped portion to be the rear end of the rubber sheet on the annular band is pressed onto the annular band to stamp the rubber sheet member.

(17) The present invention further provides a method of stamping a rubber sheet member according to item (16), wherein in cutting the long rubber sheet extending on said tangent so as to form the leading end and the rear end of said rubber sheet, both the cut-off faces of the leading end and the rear end of the rubber sheet are inclined with respect to the width direction of the long sheet, and the long rubber sheet is cut off so that, in the cut-off face of the rubber sheet leading end, the end in the width direction to be the outside in the radial direction on the annular band is located closer to the front in the traveling direction of the long sheet than the end in the width direction to be the inside in the radial direction, while in the cut-off face of the rubber sheet rear end, the end in the width direction to be the outside in the radial direction on the annular band is located closer to the rear in the traveling direction of the long sheet than the end in the width direction to be the inside in the radial direction, and a rubber sheet portion in the shape of a trapezoid or a triangle defined by the cut-off face of the rear end of the rubber sheet stamped first and the cut-off face of the leading end of the rubber sheet to be stamped next is removed.

(18) The present invention further provides a method of stamping a rubber sheet member on a side face of a body of rotation in the annular state, wherein:

a rubber sheet extruded through a die is passed through a gap formed by arranging large-diameter sides and small-diameter sides of a pair of truncated conical rollers opposite to each other for rolling, and immediately after rolling of this rubber sheet, the rubber sheet is stamped in the annular state so that the rubber sheet side rolled by the large-diameter truncated conical roller is made to correspond with the outside in the radial direction of the side face of the body of rotation while the side rolled by the small-diameter truncated conical roller is made to correspond with the inside in the radial direction of the side face of the body of rotation.

(19) The present invention further provides a method of stamping a rubber sheet member according to item (18), wherein said gap is made uniform over the width direction so as to roll the rubber sheet.

(20) The present invention further provides a method of stamping a rubber sheet member according to item (18) or (19), wherein after the rolled rubber sheet is wound around one of the truncated conical rollers by a predetermined angle, the rubber sheet is transferred from this truncated conical roller to the body of rotation while pressing the wound rubber sheet onto the body of rotation.

(21) The present invention further provides a method of stamping a rubber sheet member, wherein the rubber sheet wound around said one of the truncated conical rollers is cut off in the width direction on this truncated conical roller.

(22) The present invention further provides a device used for the stamping method of a rubber sheet member according to item (16) or (17), comprising;

a rubber sheet delivery means for delivering said long rubber sheet, a tensioner for applying a tension to the delivered long rubber sheet, a leading-end holding part for holding the leading end of the long rubber sheet, a leading-end holding part displacing means for displacing this leading-end holding part back and force between a holding start position and a holding end position, a pressing roller for pressing the rubber sheet across the leading end to the rear end onto said annular band, a rubber sheet guide mechanism for regulating an entry position of the long rubber sheet into the annular band, and a cutter for forming the leading end and the rear end of the rubber sheet by cutting said long sheet.

(23) The present invention further provides a rubber sheet member stamping device according to item (22), wherein said leading-end holding part is to hold the rubber sheet leading end by vacuum adsorption.

(24) The present invention further provides a rubber sheet member stamping device according to item (22) or (23), wherein double blades inclined in the reverse orientation from each other with respect to the face crossing the long rubber sheet delivery direction are disposed on said cutter, and anvils for receiving these blades and a cutter displacing means for displacing the cutter in the direction crossing the rubber sheet face arranged on the anvil are provided, and a gap for removing a trapezoidal or triangular rubber sheet portion left after cutting by the double blades is arranged between these anvils.

(25) The present invention further provides a device used for the stamping method of a rubber sheet member according to any one of items (18) to (21), comprising:

an extruder for extruding a rubber sheet through a die, a rolling machine consisting of a pair of truncated conical rollers arranged with their large-diameter sides and the small-diameter sides corresponding with each other, and a cutter for cutting off the rolled rubber sheet in the width direction.

(26) The present invention further provides a rubber sheet member stamping device according to item (25), wherein said rolling machine is provided between the pair of truncated conical rollers with almost a uniform gap over the width direction.

(27) The present invention further provides a rubber sheet member stamping device according to item (25) or (26), wherein the large-diameter side of one of the truncated conical rollers is arranged opposite to the outside in the radial direction of the side face of the body of rotation and the small-diameter side of this roller to the inside In the radial direction of the side face of the body of rotation in the winding posture of the rubber sheet onto the body of rotation.

(28) The present invention further provides a rubber sheet member stamping device according to any one of items (25) to (27), wherein an opening of the die of the extruder is made into the slit state whose width is gradually increased from one end to the other end, and the wide side end of the opening is arranged corresponding to the large diameter side of the truncated conical roller and the narrow side end of the opening corresponding to the small diameter side of the truncated conical roller.

Among the above inventions, the aspects according to items (16) to (28) can provide the same action as those described for the aspects regarding to the cover rubber according to items (2) to (14) corresponding to this order of the annular state rubber member. Hence, the explanation of the action of these aspects have been omitted so as to avoid duplicative explanations.

BEST MODE FOR CARRYING-OUT OF THE INVENTION

Figure 4:
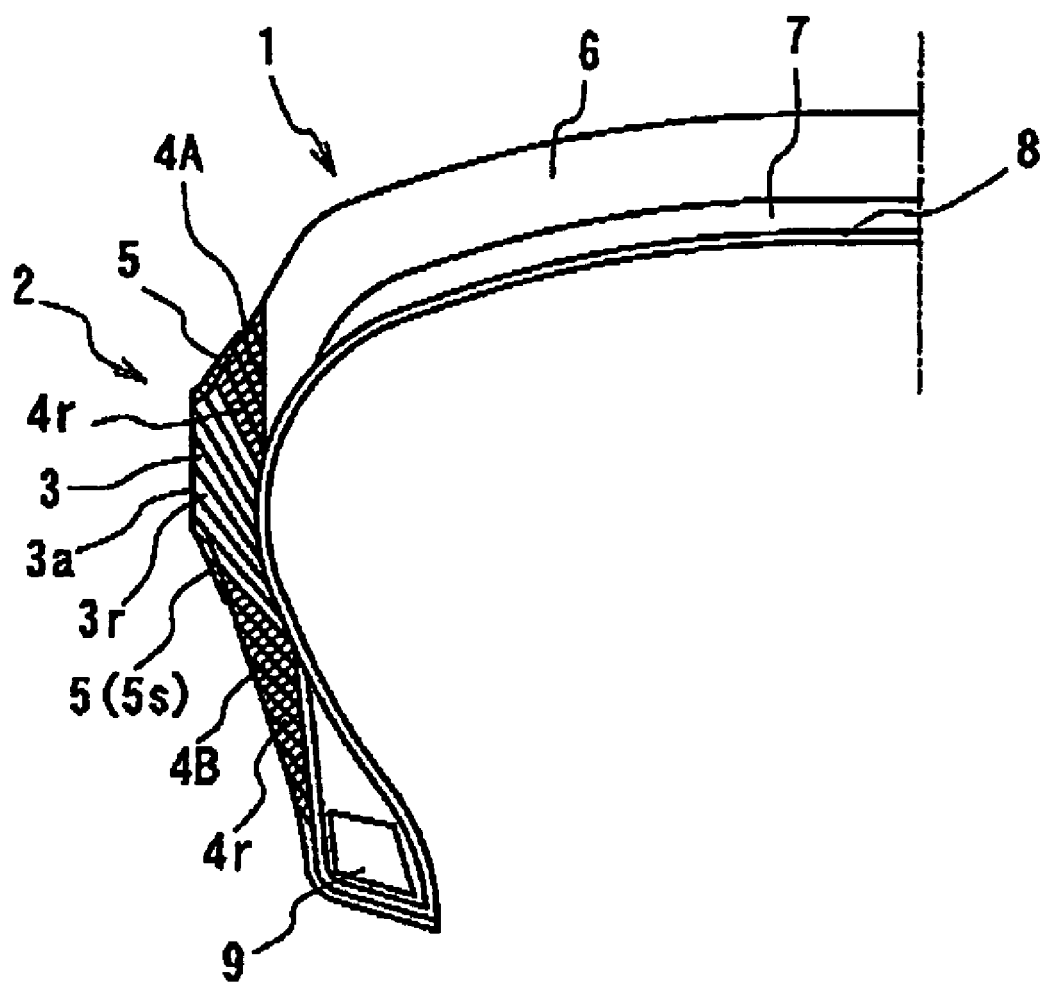
FIG. 4 is a sectional view showing a quarter part of a tire of a preferred embodiment of the preset invention on the meridional cross-section.

Below, a preferred embodiment of the present invention will be described referring to drawings. FIG. 4 is a meridional cross sectional view showing a cross section of a half on which characters or lines in color different from the surroundings are provided among halves divided by the equatorial cross section in a tire of a preferred embodiment according to the present invention. In a tire 1, a side wall 2 arranged on one side in the axial direction of a carcass 8 is comprised of a first color side wall rubber 3 expressed as a character 3a, second color side wall rubbers 4A and 4B located on both sides in the radial direction of the first color side wall rubber 3, respectively, and a second color cover rubber 5 covering the first color side wall rubber 3 other than the character 3a, the first color side wall rubber 3 and the second color side wall rubbers 4A and 4B are made of a continuous first color rubber ribbon 3r and a second color rubber ribbon 4r wound in plural turns, respectively, and the cover rubber is made of a single thin annular rubber sheet 5s. Here, the first color is white, for example, while the second color is black, for example.

In the figures, both boundary surfaces of the first color side wall rubber 3 with the second color side wall rubbers 4A and 4B are arranged with being inclined in almost parallel, but these boundary surfaces may be inclined in the reverse orientation from each other, and either of the radial extending width outside in the axial direction or the radial extending width inside in the axial direction of the first color side wall rubber 3 can be larger and moreover, the second color side wall rubbers 4A and 4D can be continuous inside in the axial direction of the fist color side wall rubber 3.

The side wall which is not shown but arranged on the other side in the axial direction of the carcass 8 is comprised of the continuous second color rubber ribbon 4r wound in plural turns in all the areas, and in FIG. 6 represents a tread, 8 is a belt and 9 is a bead core. The tread 6 is also made of a continuous rubber ribbon wound in plural turns.

Figure 1:
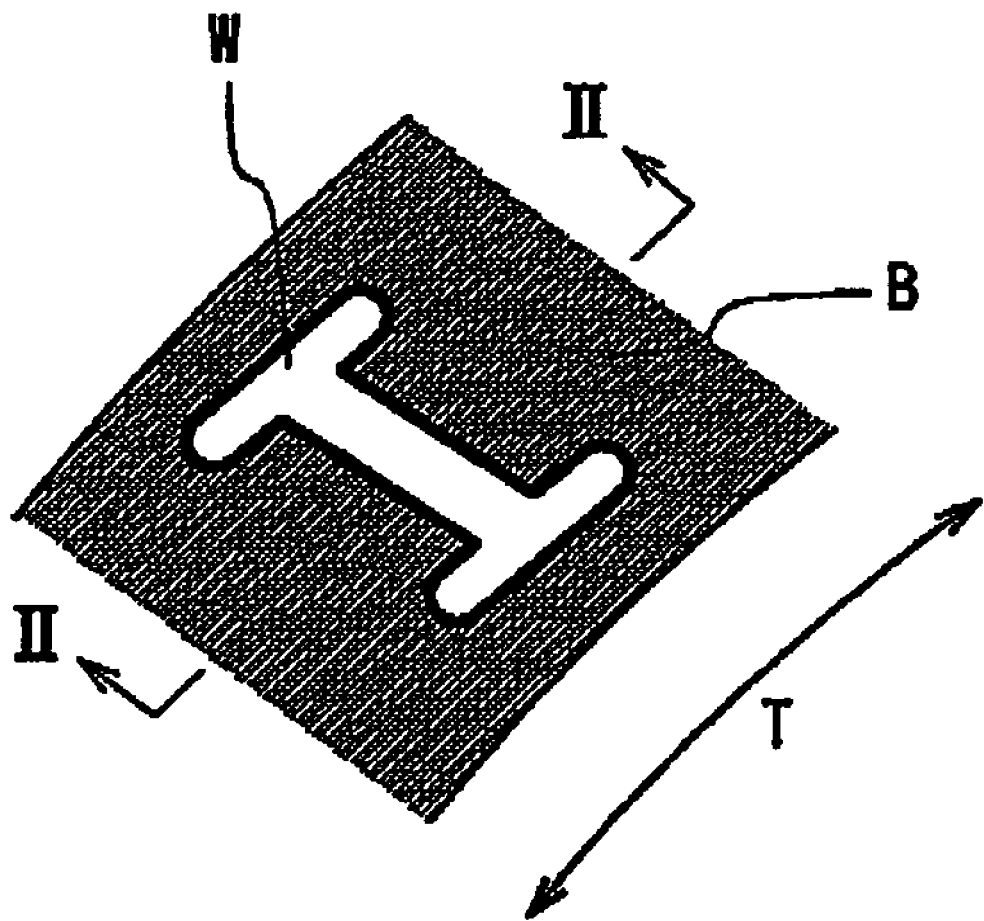
FIG. 1 is a perspective view showing a character portion expressed on the surface of a product tire.
Figure 2A:
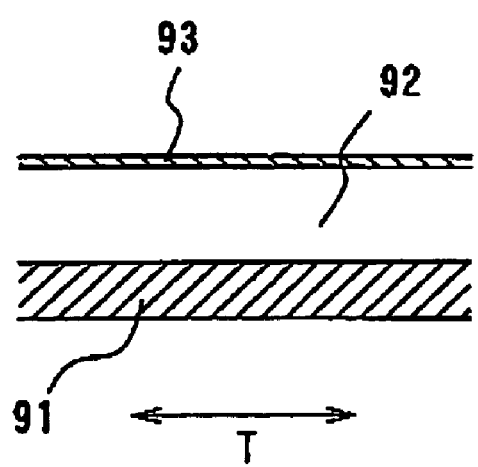
FIGS. 2(a) and 2(b) are sectional views showing the state in the middle of manufacture of the character portion, respectively.
Figure 2B:
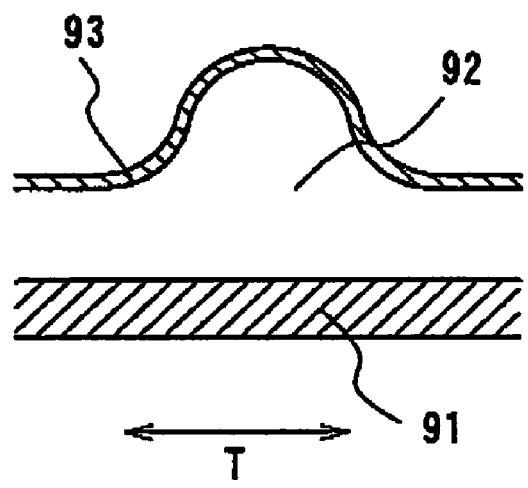
Figure 3A:
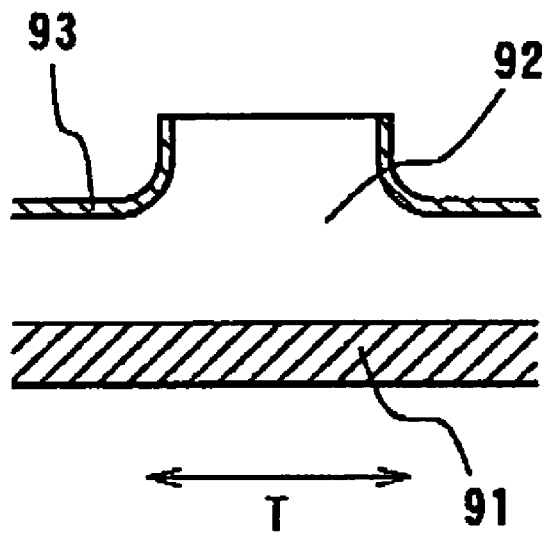
FIGS. 3(a) and 3(b) are a sectional view and a perspective view showing the detail of the character portion in the prior art, respectively.
Figure 3B:
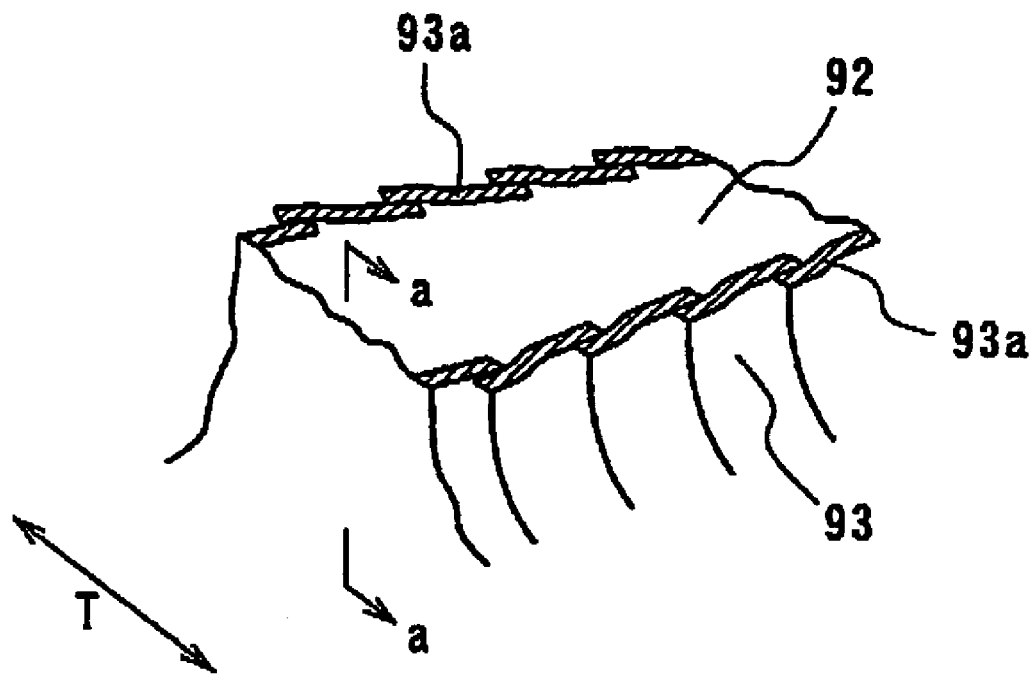
Figure 5:
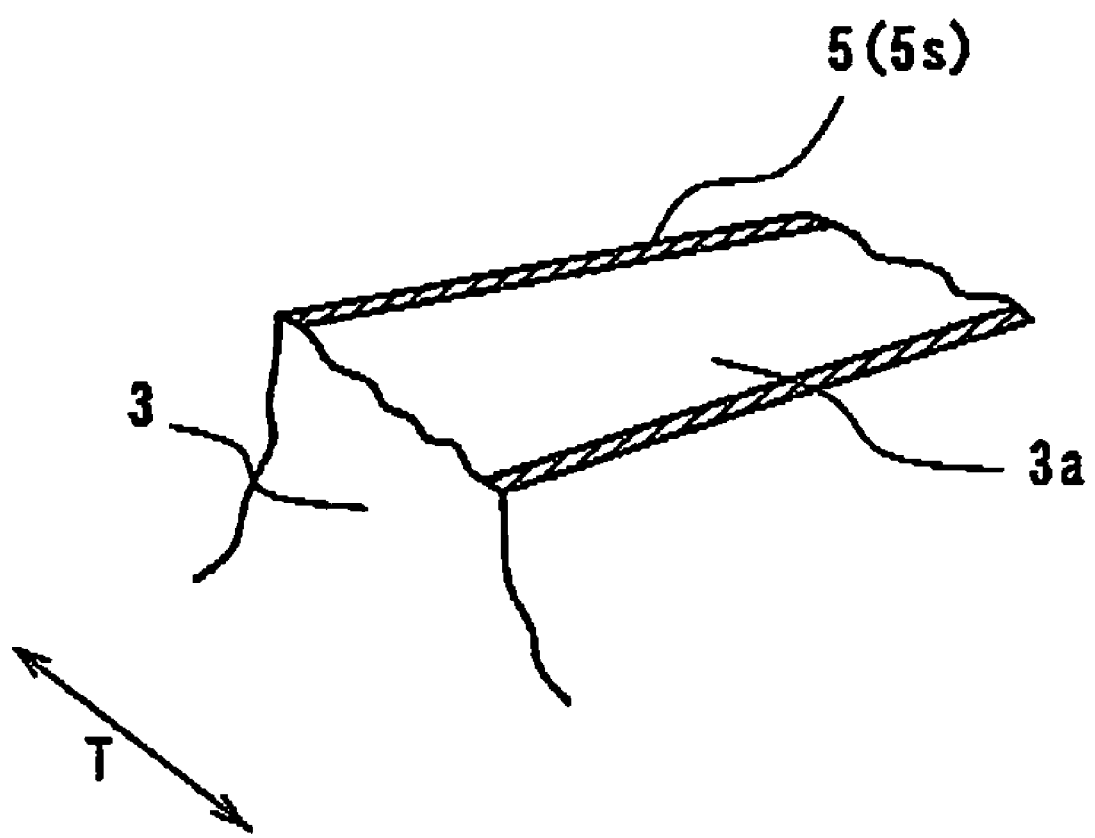
FIG. 5 is a perspective view showing a detailed portion of a part of the character.

FIG. 5 is a perspective view showing a detailed portion of a part of the character 3a shown in correspondence with FIG. 3(b) used above, and since the cover rubber 5 is constituted by a single thin annular rubber sheet 5s, a zigzag-state step does not appear around the character 3a, and the profile of the character 3a extending in the direction crossing the tire circumferential direction T can be also expressed sharply.

Figure 6A:
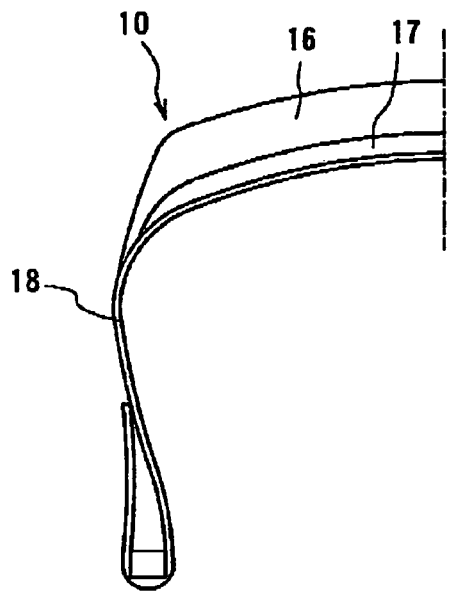
FIGS. 6(a) to 6(c) are meridional cross sectional views of a green tire for explaining the process for shaping a green tire by stamping a side wall rubber, respectively.
Figure 6B:
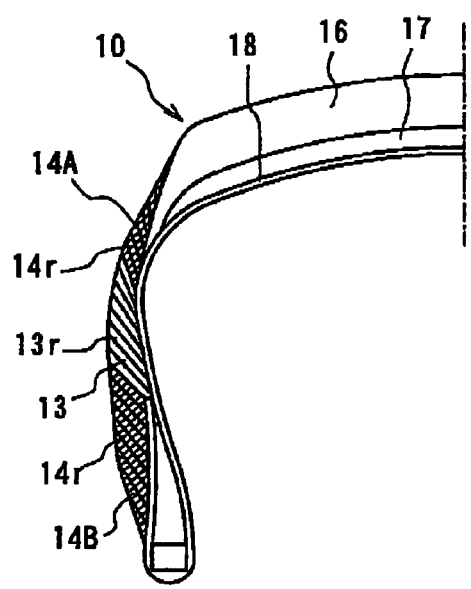
Figure 6C:
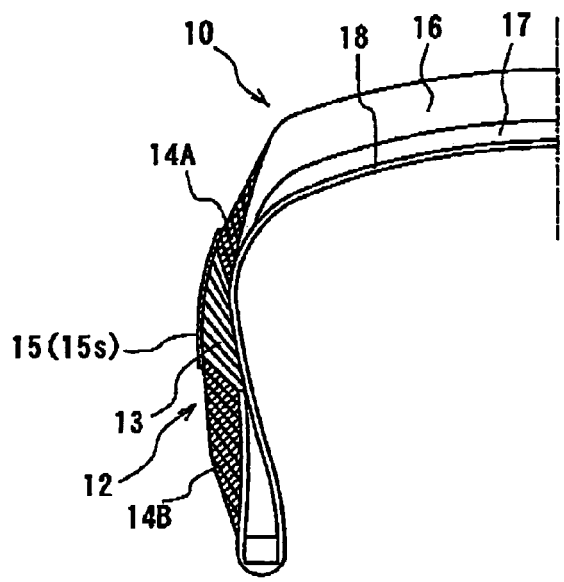

Next, a method of manufacturing this tire 1 will be explained. FIG. 6 is a meridional cross sectional view of a green tire for explaining a process to shape a green tire by stamping the side wall on the side having characters or lines, and first, as shown in FIG. 6(a), a carcass member 18 is toroidally formed on the outside of a shaping drum or a rigid core, not shown, and FIG. 6(a) shows the state where a belt member 17 and a tread rubber 18 have been already stamped outside in the radial direction on the so formed carcass member 18. After the state shown in FIG. 6(a), with regard to the side wall on the side having the characters or lines, a second color side wall rubber 14A outside in the radial direction is stamped by winding a continuous second color rubber ribbon 14r in plural turns, as shown in FIG. 6(b), and next, a first color side wall rubber 13 is stamped by winding a continuous first color rubber ribbon 13r in plural turns and subsequently, a second color side wall rubber 14B inside in the radial direction is stamped by winding a continuous second color rubber ribbon 14r in plural turns. After that, as shown in FIG. 6(c), a cover rubber 15 is stamped outside these side wall rubbers 13, 14A and 14B by winding a rubber sheet 15s annularly in one turn so as to shape the green tire 10.

The order to stamp the side wall rubbers 13, 14A and 14B, here, can be determined as appropriate depending on how to laminate the rubber ribbons.

After that, if the green tire 10 is formed on the shaping drum, the green tire 10 is removed from the shaping drum and transferred to a vulcanizing machine, while if the green tire 10 is formed on the rigid core, the green tire 10 is not removed from the rigid core but transferred to the vulcanizing machine together with the rigid core so as to vulcanize the green tire 10 by the vulcanizing machine.

In vulcanizing the green tire 10, according to the above-mentioned prior art, using a mold having a recess portion corresponding to the characters or lines, a projecting portion corresponding to this recess portion is formed on the tire and after vulcanization, the projecting portion of the tire is buffed to express the first color characters or lines.

Figure 7:
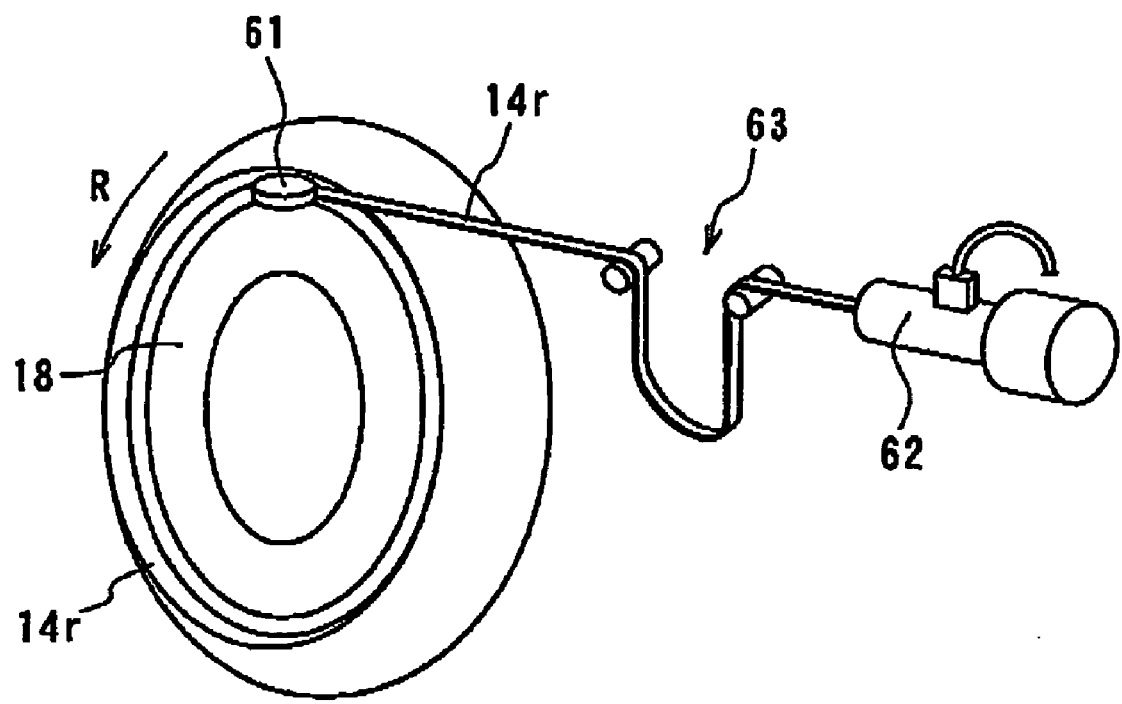
FIG. 7 is a perspective view showing a method of forming a side wall rubber by winding a rubber ribbon.

Here, the side wall rubbers 13, 14A and 14B can be stamped by a known method of winding the rubber ribbon, and FIG. 7 shows one example. On the side face of the carcass member 18 formed on the shaping drum, not shown, in the case of the second color side wall rubber 14A, for example, the leading end of the second color rubber ribbon 14r is pressed and then, while controlling the position of the second color rubber ribbon 14r in the radial direction and moving a stamping roller 61 for pressing this onto the side face of the carcass member 18, the shaping drum is rotated in the R direction in plural turns so as to stamp the second color side wall rubber 14A. At this time, the second color rubber ribbon 14r is extruded through an extruder 62 synchronously with the winding by the amount by which the second color rubber ribbon 14r is wound. By providing a festoon 63, unbalance between the winding amount and the extrusion amount of the second color rubber ribbon 14r can be adjusted.

According to this manufacturing method, the extruder 62 can be made small-sized, one type of the rubber ribbon 14r can form rubber members in various sectional shapes, and moreover, size can be switched only by choosing a trajectory program for displacing the stamping roller 61 from those stored in advance in correspondence with each size and by calling and starting it, by which instantaneous size switching is enabled and manufacturing of small amount in other types can be realized efficiently.

Figure 8A:
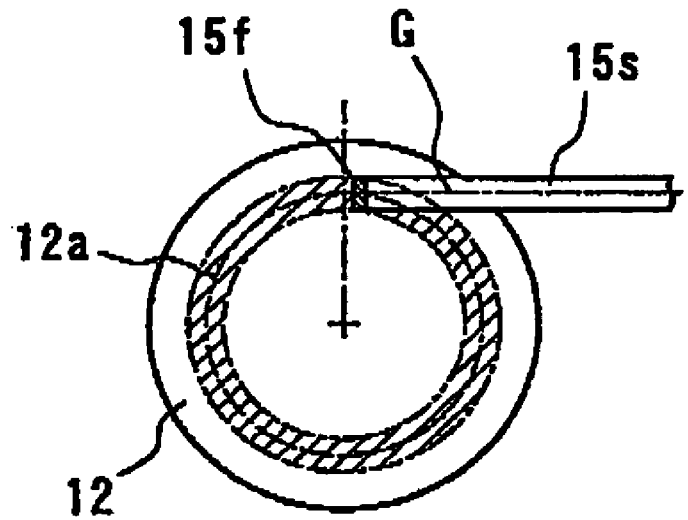
FIGS. 8(a) and 8(b) are schematic diagrams showing a side face of a green tire being shaped, respectively.
Figure 8B:
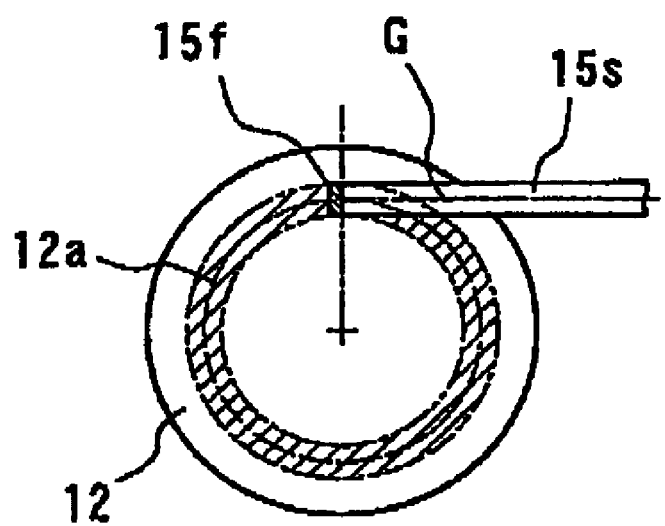
Figure 9A:
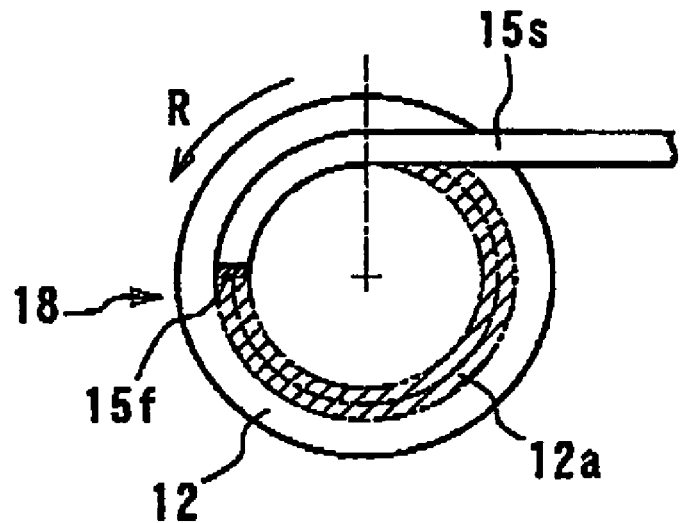
FIGS. 9a and 9b are schematic diagrams showing a side face of a green tire in the process subsequent to FIGS. 8(a) and 8(b), respectively.
Figure 9B:
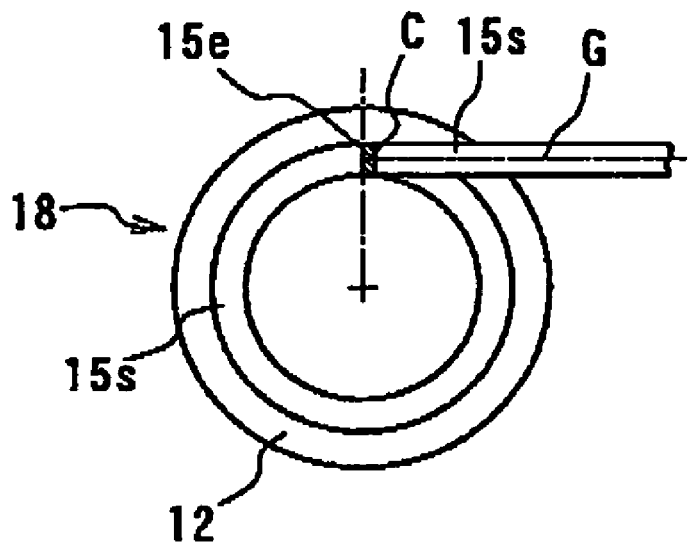

Next, a method of stamping the cover rubber 15 and a device for that will be explained. FIGS. 8 and 9 are schematic diagrams showing the side face of the green tire in the middle of shaping, and in order to stamp the cover rubber 15, first, as shown in FIG. 8(a), a leading end 15f of the long rubber sheet 15s arranged on a tangent G of an annular band 12a on the side wall rubber 12, to be the stamping face for the cover rubber 15, having been already stamped on the outside of the carcass member 18 is held, and then, as shown in FIG. 8(b), this leading end 15f is moved onto the annular band 12a and pressed. And as shown in FIG. 9(a), the carcass member 18 is rotated around its central axis in the direction of the arrow R while applying a tension to the rubber sheet 15s so as to stamp the rubber sheet 15s on the annular band, and after the rotation of the carcass member 18 is stopped, as shown in FIG. 9(b), an unstamped portion of the long rubber sheet 15s is cut off in the cut-off face C extending in the width direction of the long rubber sheet 15s. Next, the unstamped portion to be a rear end 15e of the rubber sheet wound in the annular state is pressed onto the annular band 12a to complete stamping of the cover rubber 15.

Figure 10:
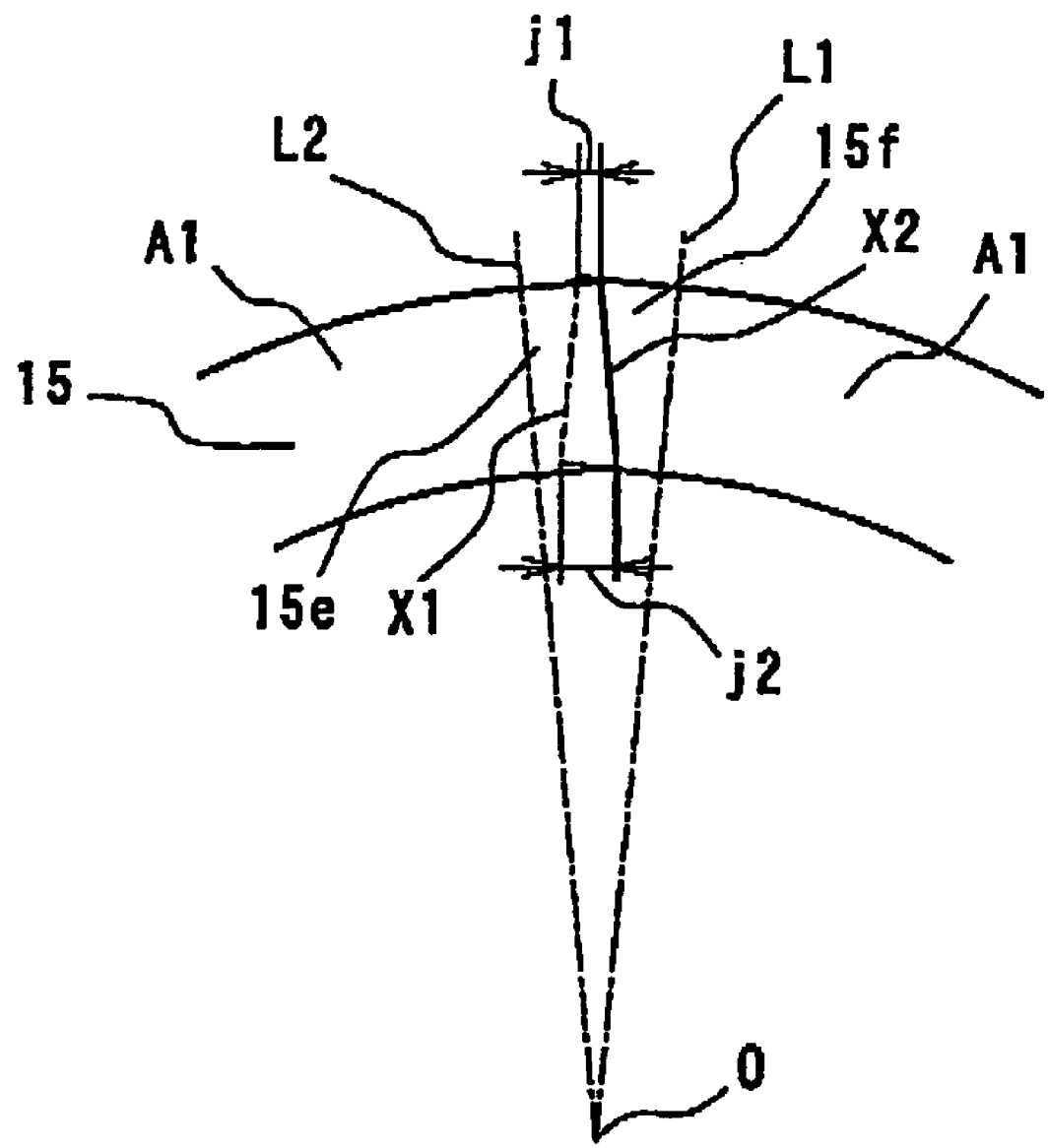
FIG. 10 is a front view showing an overlapping portion between a leading end and a rear end of a rubber sheet.

FIG. 10 is a view of an overlapping portion between the leading end 15f and the rear end 15e of the rubber sheet 15s seen from the axial direction of the green tire 10 after the cover rubber 15 has been stamped, and an area A1 on the large arc side of the cover rubber 15 defined by a straight lines L1 and L2 extending in the radial direction from the central axis O of rotation of the carcass member 18 is an area stamped by rotation of the carcass member 18 and deformed into the arc state, while the leading end 15f defined by the straight line L1 and a starting end X1 is a non-deformed area required for holding. So, the leading end 15f forms a rectangle, and the rear end 15e defined by the straight line L2 and an terminating end X2 is also a non-deformed area required for cutting and forms a rectangle, and as a result, in the overlapping portion between the leading end 15f and the rear end 15e defined by the starting end X1 and the terminating end X2, an inner width j2 in the radial direction is larger than an outer width j1 in the radial direction. Then, even if the width j1 is restrained to the minimum in order to reduce the overlapping portion for improvement of tire unbalance, the width j2 can not be minimized, which is a problem.

Figure 11:
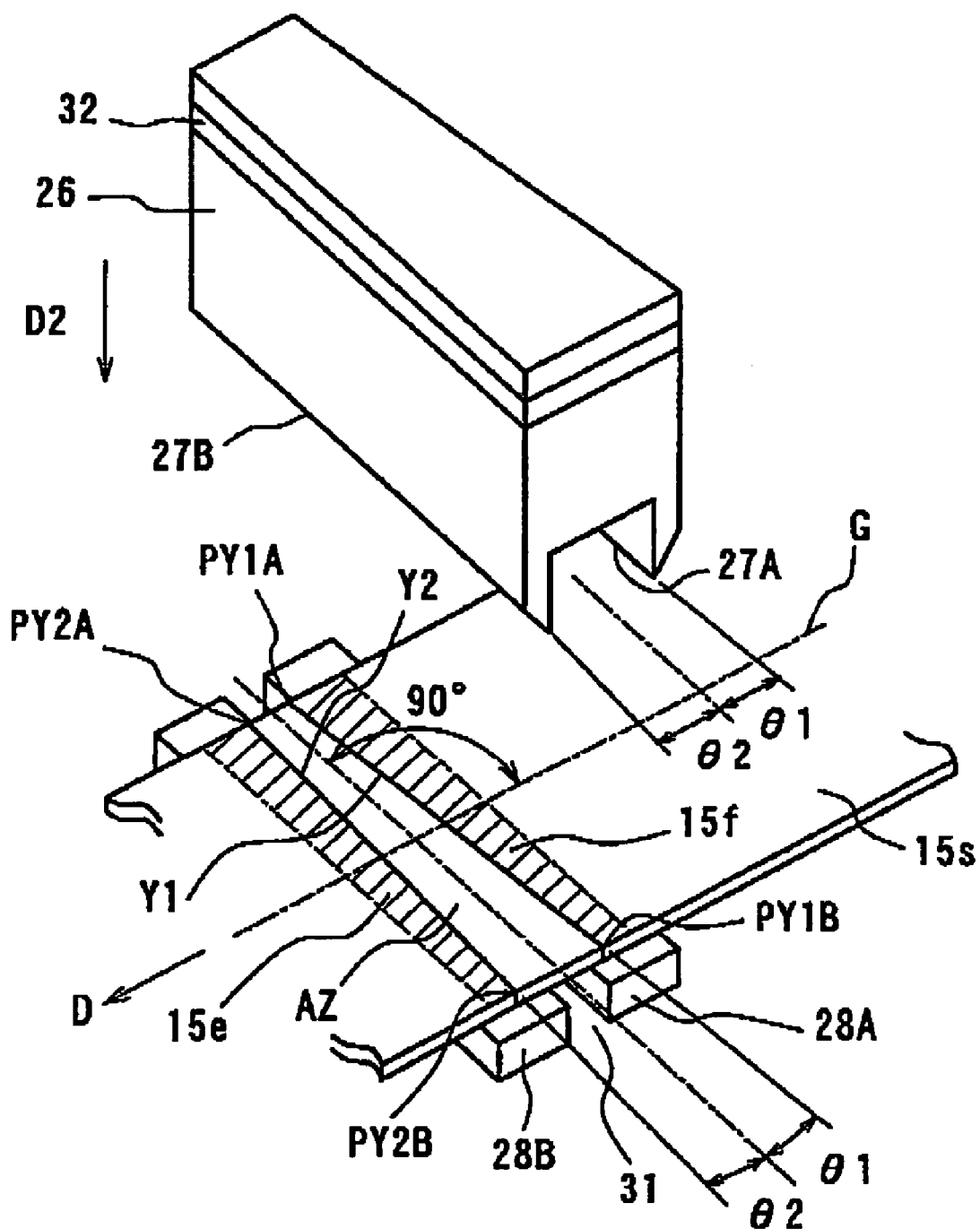
FIG. 11 is a perspective view showing a cut-off portion of a long sheet.

FIG. 11 is a perspective view showing a cut-off portion of the long sheet for explaining a method to solve the above problem. In forming said rubber sheet leading end 15f and the rear end 15e. by cutting off the long rubber sheet 15s extending on the tangent G, it is preferable to cut off the long rubber sheet 15s so that a cut-off face Y1 of the rubber sheet leading end 15f and the cut-off face Y2 of the rear end 15e are both inclined with respect to the width direction of the long sheet 15s by angles θ1 and θ2, respectively, and in the cut-off face Y1 of the rubber sheet leading end 15f, a width-direction end PY1A on the side to be outside in the radial direction on the annular band 12a is located closer to the front in the long sheet traveling direction shown by an arrow D than a width-direction end PY1B on the side to be the inside in the radial direction, while in the cut-off face Y2 of the rubber sheet rear end 15e, a width-direction end PY2A on the side to be the outside in the radial direction on the annular band 12a is located closer to the rear in the long sheet traveling direction D than a width-direction end PY2B on the side to be the inside in the radial direction. When cutting is performed in this way, a rubber sheet portion AZ in the trapezoidal or triangular shape defined by the cut-off face Y2 of the rear end 15e of the rubber sheet which has been stamped first and the cut-off face Y1 of the leading end 15f of the rubber sheet to be stamped next is removed at each cutting.

Figure 12:
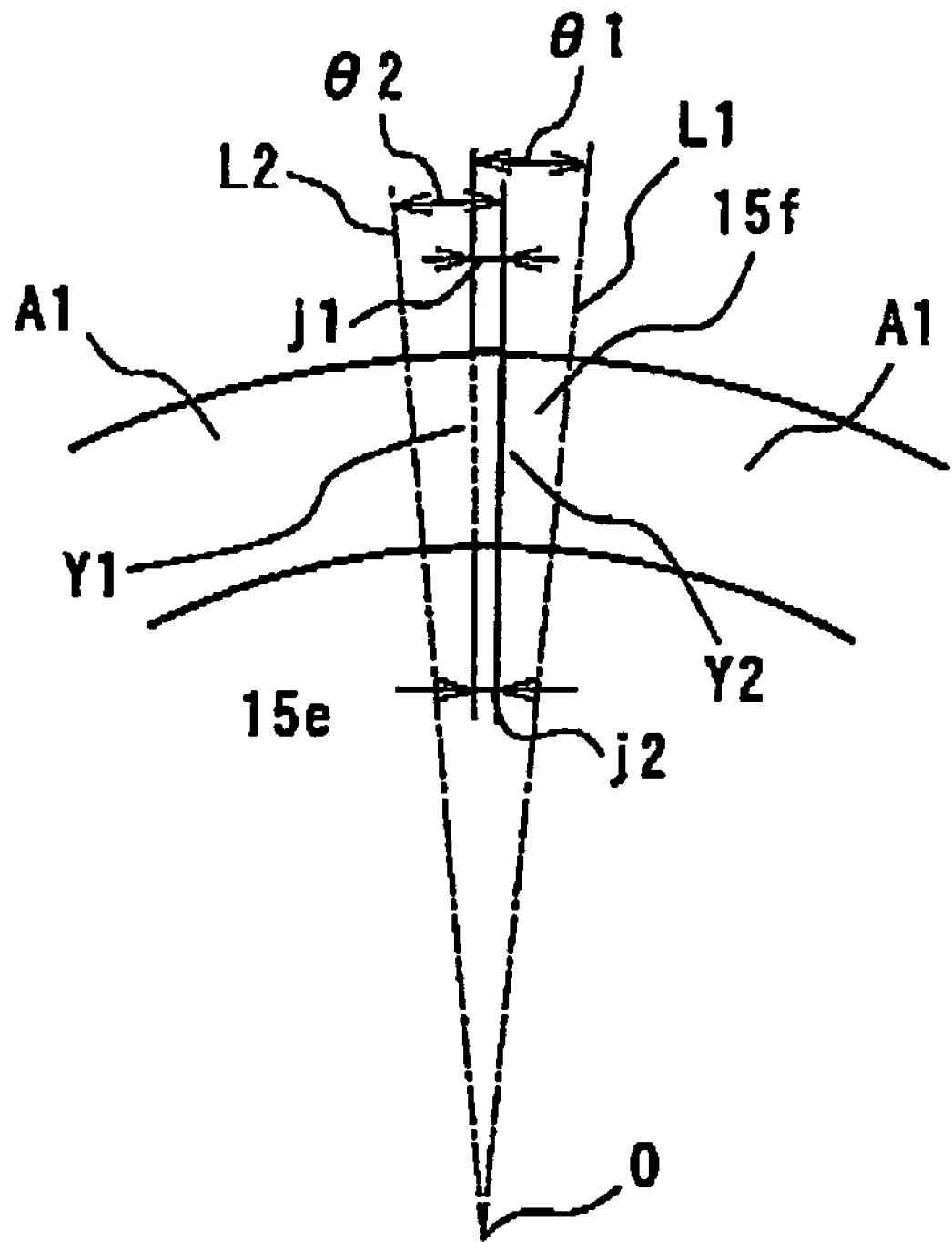
FIG. 12 is a front view showing an overlapping portion between a leading end and a rear end of a rubber sheet.

FIG. 12 is a view showing the overlapping portion between the leading end 15f and the rear end 15 when the rubber sheet 15s having been cut in this way is stamped on the annular band 12a, corresponding to FIG. 10 used above, and the area A1 on the large arc side of the cover rubber 15 defined by the straight lines L1 and L2 extending in the radial direction from the center of rotation O of the carcass member 18 is an area deformed in the arc state as in that shown in FIG. 10. And the leading end 15f defined by the straight line L1 and the starting end Y1 (that is, the cut-off face Y1 of the leading end 15f) is a non-deformed area, but L1 and X1 are mutually inclined by the angle θ1, while the rear end 15e defined by the straight line L2 and the terminating end X2 (that is, the cut-off face Y2 of the rear end 15e) is also a non-deformed area, but L2 and X2 are mutually inclined by the angle θ2, and unlike those shown in FIG. 10, the starting end X1 and the terminating end X2 can be made almost in parallel. By this, in the overlapping portion between the leading end 15f and the rear end 15e, the inner width j2 in the radial direction and the outer width j1 in the radial direction can be minimized, whereby tire unbalance can be improved.

Figure 13:
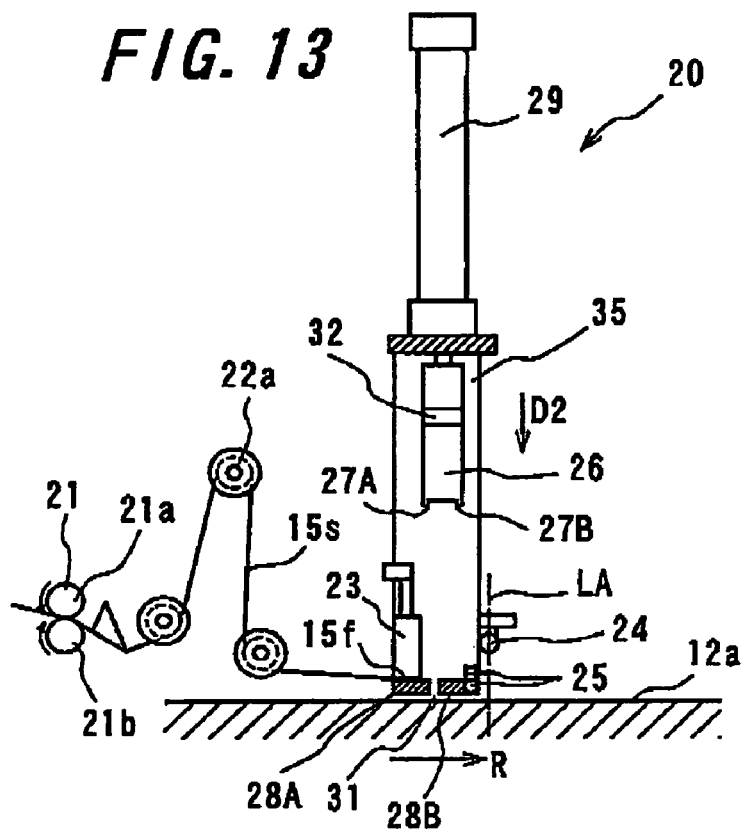
FIG. 13 is a partial schematic sectional view of a cover rubber stamping device shown on the face in parallel with a central axis of rotation of a carcass member.

Next, a cover rubber stamping device used in stamping the above-mentioned cover rubber 15 will be explained. FIG. 13 is a schematic partial sectional view of a cover rubber stamping device showing the state after the long rubber sheet 15s is cut in the plane in parallel with the central axis O of rotation of the carcass member 18 passing through the above tangent G. A cover rubber stamping device 20 is provided with a rubber sheet delivery means 21 for reeling the long rubber sheet 15s prepared by being wound around a reel, not shown, out of the reel for delivery, a tensioner 22 for applying a tension to the delivered long rubber sheet 15s, a leading end holding part 23 for holding the leading end 15f of the long rubber sheet, a leading-end holding part displacing means, not shown, for displacing this leading end holding part 23 back and forth between the holding start position and the holding end position, a pressing roller 24 for pressing the rubber sheet from the leading end 15f to the rear end 15e onto the annular band, a rubber sheet guide mechanism 25 for regulating an entry position of the long rubber sheet 15s into the annular band 12a, and a cutter 26 for forming the rubber sheet leading end 15f and the rear end 15e by cutting off said long sheet 15s. And these means are fixed or mounted capable of relative displacement onto a support member 35.

In FIG. 13, 12a indicates an annular band to be the stamping face for the rubber sheet 15s, and the arrow R shows its circumferential direction. LA indicates a straight line corresponding to the position of the starting end Y1 of the rubber sheet 15s to be wound.

Here, the leading end holding part 23 is constituted to hold the rubber sheet leading end 15f by vacuum adsorption, and by this, only one face of the leading end 15f is held with the other face brought into contact with the annular band 12a.

Thus, the rubber sheet can be held at the very end, and the size of the leading end 15f to be the non-deformed area can be minimized.

As shown in the above FIG. 11, double blades 27A and 27B inclined in the reverse orientation from each other with respect to the face crossing the long rubber sheet delivery direction D are disposed on the cutter 26. And the cover rubber stamping device 20 is provided with anvils 28A and 28B respectively receiving these blades 27A and 27B, and a cutter displacing means 29 for displacing the cutter in the direction D2 crossing the rubber sheet face arranged on the anvils 28A and 28B, and between these anvils 28A and 28B, a gap 31 for removing a trapezoidal or triangular rubber sheet portion AZ cut off by the double blades 27A and 27B is arranged.

In this FIG. the cutter displacing means 29 is constituted by a simple air cylinder, but another driving mechanism can also be used. Also, by arranging a buffer 32 made of rubber or urethane, for example, at a portion located between the cutter displacing means 29 and the double blades 27A and 27B of the cutter 26, contact of the blades with the anvils 28A and 28B can be secured at any position.

Also, the rubber sheet delivery means 21 is constituted to be operated by holding the rubber sheet 15s between a pair of delivery rollers 21a and 21b and by driving these delivery rollers 21a and 21b by a motor, not shown, and by setting the delivery speed at this time smaller than the circumferential speed of the annular band 12a on the above tangent G, a tension in the middle of winding can be applied to the rubber sheet 15s so that generation of wrinkles on the cover rubber 15 can be prevented.

Moreover, the tensioner 22 is provided to completely prevent generation of wrinkles even at start and end of the winding. The tensioner 22 can be operated by pulling a tension roller 22a by a cylinder, not shown, and the tension is adjusted by adjusting the tensile force of the cylinder.

It is preferable that the pressing roller 24 for pressing the rubber sheet 15s onto the annular band 12a is in the cone state having a large diameter on the side opposite to the outside of the annular band 12a in the radial direction and a small diameter on the side opposite to the inside of the annular band 12a in the radial direction. By this, a slip rate between the rubber sheet 15s and the pressuring roller 24 can be reduced almost to zero over the full length of the pressing roller 24.

Figure 14:
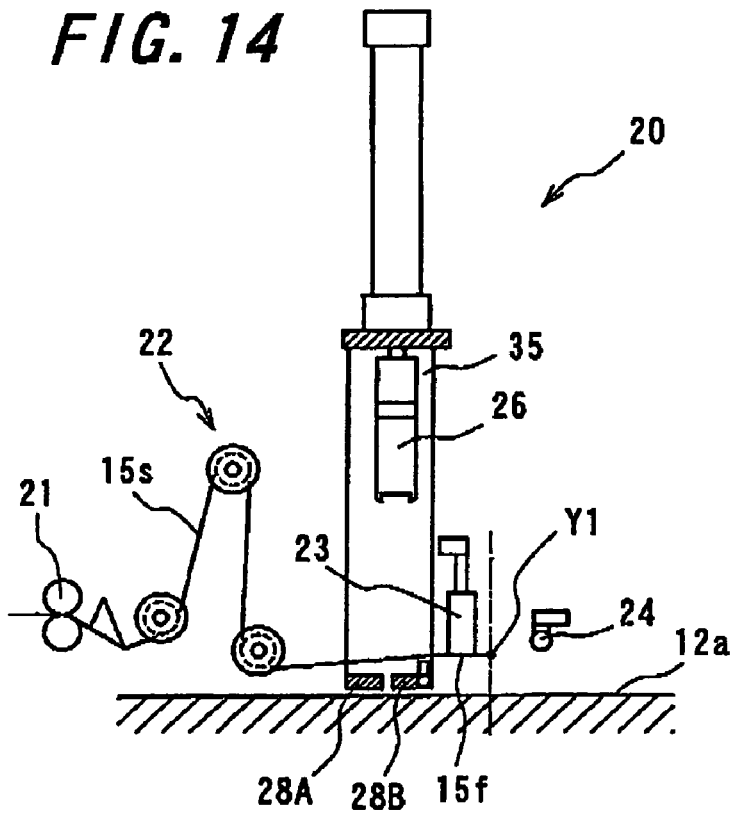
FIG. 14 is a diagram for explaining operation of a cover rubber stamping device.

Next, operation of the cover rubber stamping device 20 will be described referring to FIGS. 14 and 15. After the state shown in FIG. 13, vacuum is activated to hold the rubber sheet leading end 15f with the leading end holding part 23, and the leading end holding part 23 is displaced to the state shown in FIG. 14 so that the starting end Y1 is located on the straight line LA. And next, from the shown state, the leading end holding part 23 is made closer to the annular band 12a, and then, the vacuum is deactivated, the holding of the leading end 15f is released and the leading end 15f is transferred to the annular band 12a. Al this time, in order to prevent interference with the leading end holding part 23, the anvils 28A and 28B together with the support member 35 are separated away from the straight line LA, and the pressing roller 24 is also displaced in the direction opposite to the displacement direction of the anvils 28A and 28B.

Figure 15A:
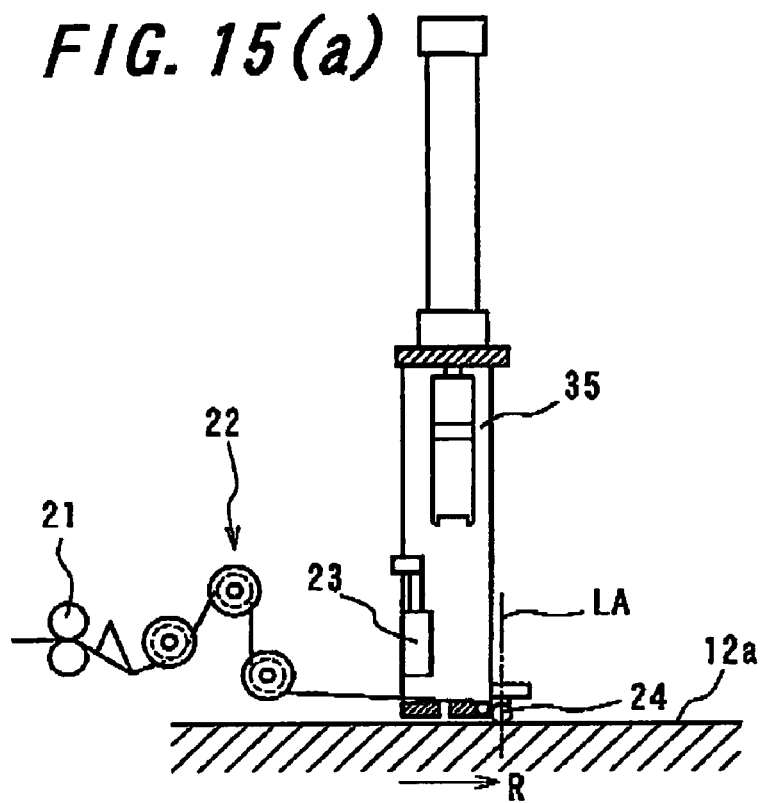
FIGS. 15(a) and 15(b) are diagrams for explaining operation of a cover rubber stamping device subsequent to FIG. 14.

Then, as shown in FIG. 15(a), the leading end holding part 23, the support member 35 and the pressing roller 24 are returned to the original position and then, the pressing roller 24 is made closer to press the leading end 15f onto the annular band 12a, and in that state, the carcass member 18 is rotated so that the rubber sheet 15s is stamped on the annular band 12a.

Figure 15B:
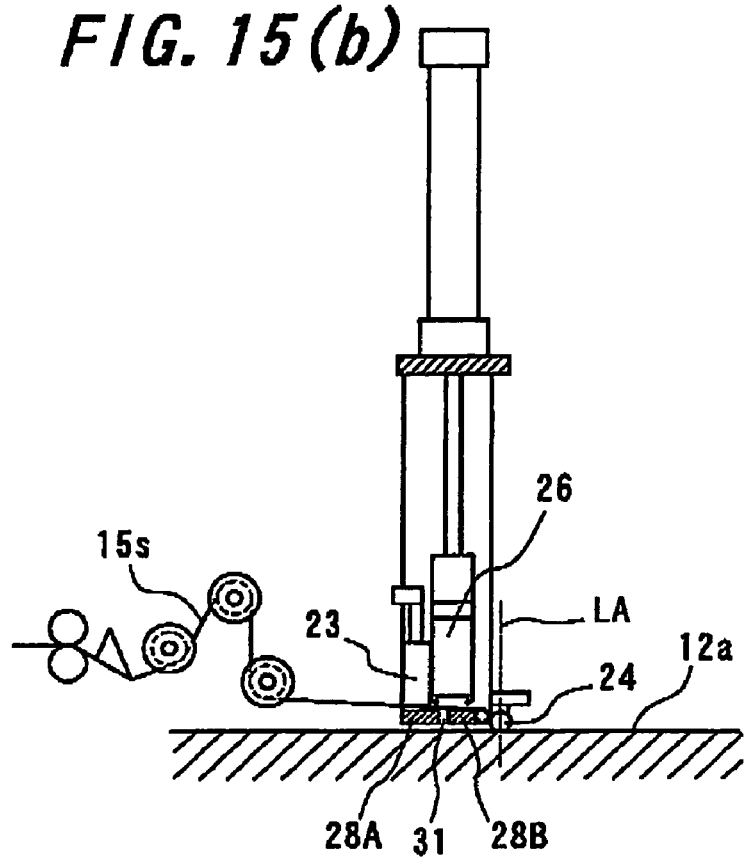

Then, after the carcass member 18 is rotated almost one turn, the rotation of the carcass member 18 is stopped and as shown in FIG. 15(b), the leading end holding part 23 is lowered to press the portion to be the leading end 15f of the rubber sheet 15s, and the cutter 26 is lowered so as to cut off the rubber sheet 15s. At this time, as mentioned above, the cut-off face Y1 of the leading end and the cut-off face Y2 of the rear end inclined opposite to each other with respect to the width direction of the rubber sheet is formed, and the rubber sheet portion AZ held between these cut-off faces is ejected through the gap 31 provided between the anvils 28A and 28B by operating an end rubber ejecting device, not shown. And after the cutter 26 is raised to the original standby position, the carcass member 18 is rotated by a micro angle, and the rear end 15e of the rubber sheet, which is an unstamped portion, is wound while being pressed by the pressing roller 24 to complete the operation of one cycle.

Figure 16:
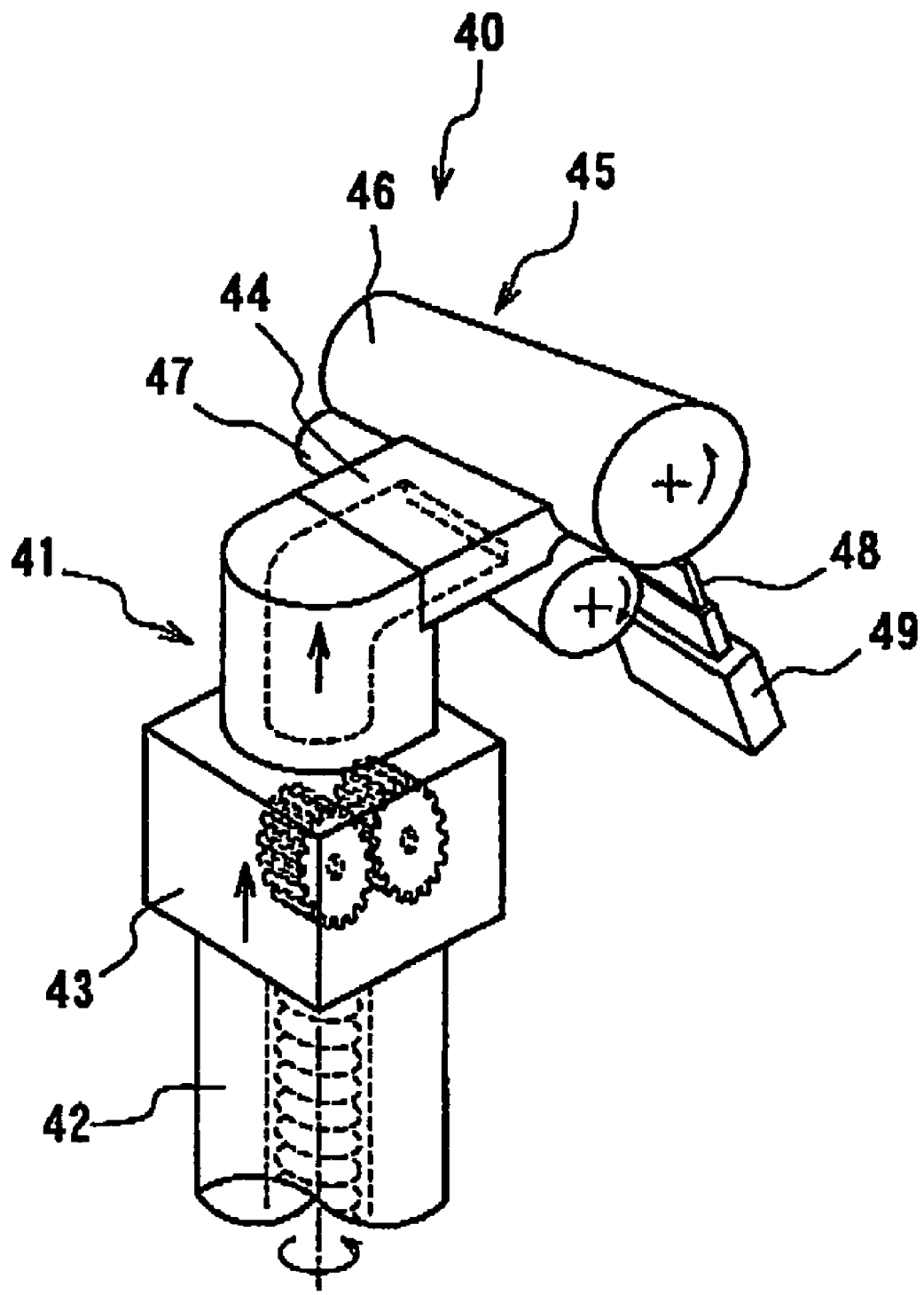
FIG. 16 is a perspective view showing a cover rubber stamping device of another preferred embodiment.

Next, a preferred embodiment relating to the stamping method of the cover rubber 15 and the device for that, different from the above, will be described. FIG. 16 is a perspective view showing a cover rubber stamping device for stamping the cover rubber 15 onto the annular band 12a of the side wall rubber 12 to be its stamping face. A cover rubber stamping device 40 is provided with a rolling machine 45 comprised of a large roller 46 and a small roller 47 constituting a pair of truncated conical rollers, an extruder 41 for extruding the rubber sheet into a gap formed between these rollers 46 and 47, and a cutter 48 for cutting a rolled rubber sheet 50s in the width direction on the large roller 46.

The extruder 41 is provided with a gear pump part 43 for controlling an extrusion amount of the rubber sheet, a screw part 42 for plasticizing a rubber material and delivering it to the gear pump part 43, and a die 44 for specifying the sectional shape of the extruded rubber sheet. And the rollers 46 and 47 of the rolling machine are driven by a motor and a chain, not shown, in synchronization with each other, and the cutter 48 can be brought closer to or separated from the large roller 46 by a cutter cylinder 49 at the predetermined timing, and by this operation, the rubber sheet 50s on the large roller 46 can be cut off in the width direction.

Figures 17A, 17B:
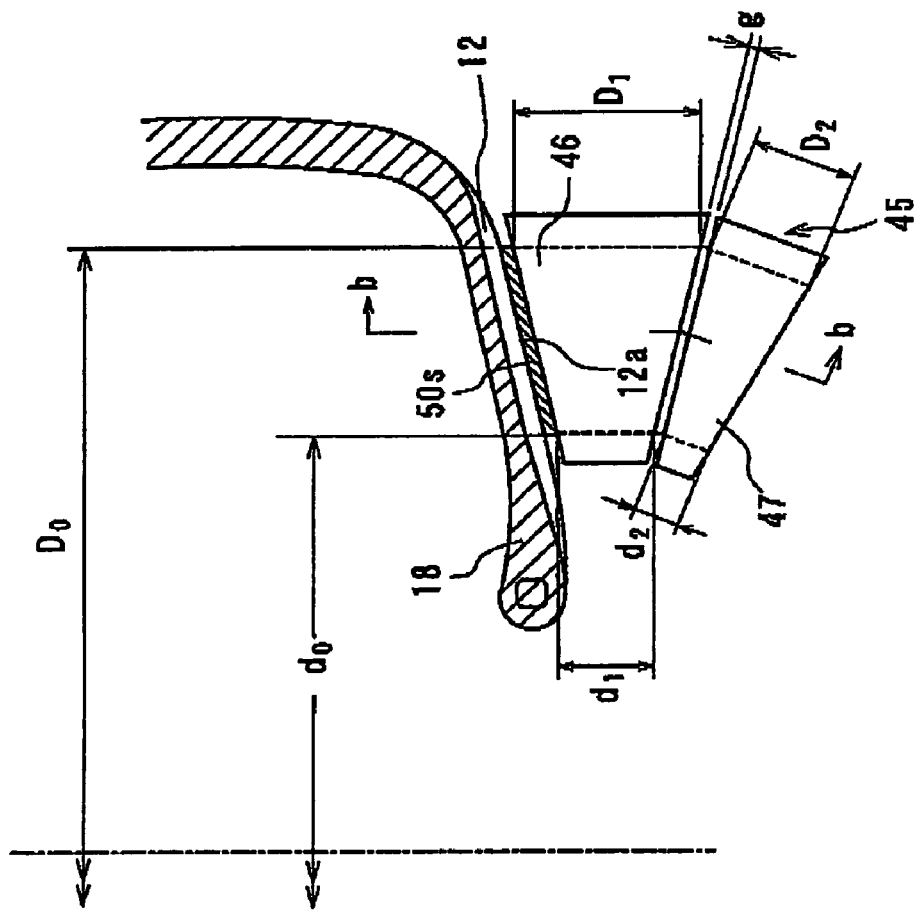
FIGS. 17(a) and 17(b) are partial sectional views showing relative arrangement of a rolling machine and a carcass member.

FIG. 17 is a view showing the relative positions of the rolling machine 45 and the carcass member 18 on which the side wall rubber 12 has been already stamped, and FIG. 17(a) is a partial sectional view in the meridional cross section of the carcass member 18, and FIG. 17(b) is a partial sectional view corresponding to the arrow view b-b of FIG. 17(a). The rolling machine 45 is for stamping the rubber sheet 50s to be the cover rubber 15 on the annular band 12a of the side wall rubber 12, and the large roll 46 of the rolling machine 45 is arranged in contact with the annular band 12a through a slight gap, while the small roll 47 is provided on the side of the large roll 46 opposite to the carcass member 18 in contact with the large roll 46 through a gap g which is uniform in the width direction. And the tip end of the die 44 is arranged closer to this gap, and the cutter 48 is provided on the large roll 46 capable of separating and approaching along its radial direction on the gap side opposite to the die 44 side.

Here, each of the outside and inside diameters of annular band 12a in the radial direction is set as $D_0$ and $d_0$, and the diameters of the large roll 46 at both end positions of the rubber sheet 50s in the width direction is set as $D_1$ on the large diameter side and d1 on the small diameter side. Similarly, the diameters of the small roll 47 at both end positions of the rubber sheet 50s in the width direction are set as $D_2$ on the large diameter side and $d_2$ on the small diameter side. Then, a relationship represented by an equation (1) is established among these $D_0$ to $D_2$ and $d_0$ to $d_2$. By having the equation (1)

established, the rubber sheet portion to be the outer circumference of the cover rubber 15 in the radial direction and the rubber sheet portion to be the inner circumference in the radial direction is elongated at the same elongation rate, and by decreasing this elongation rate, the cover rubber 15 whose dimension is stable at any portion can be formed.

$$D_0/d_0 = D_1/d_1 = D_2/d_2 \quad (1)$$

Figure 18:
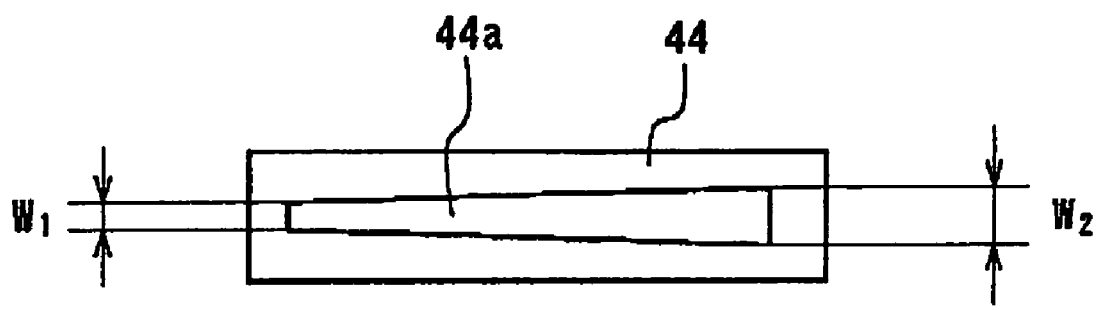
FIG. 18 is a front view showing an opening of a die.

FIG. 18 is a front view showing an opening 44a of the die 44. This opening 44a is in the slit state, and when the opening width of one end is $W_1$ and the opening width of the other end is $W_2$, $W_1$ and $W_2$ is in the relation satisfying an equation (2), and the width of the intermediate portion of the opening 44a is set so that it is linearly increased from one end to the other end. Also, the die 44 is arranged so that one end to be the narrow-side end of the opening 44a corresponds with the small diameter side of the roller 46 or 47, while the other end to be the wide-side end of the opening 44a with the large diameter side of the roller 46 or 47, and by this, a flow rate of the rubber passing through the wide-side end of the opening 44a is made larger than the flow rate of the rubber passing the narrow-side end so that a uniform elongation rate and thickness can be secured from the outside in the radial direction with longer circumferential length to the inside in the radial direction with shorter circumferential length of the cover rubber 15.

$$W_1/W_2 = D_1/d_1 = D_2/d_2 \quad (2)$$

In the above-mentioned example, the width change between both ends of the opening 44a is made linear, but this can be nonlinear according to the desirable thickness distribution of the cover rubber to be stamped in the annular state.

Figure 19:
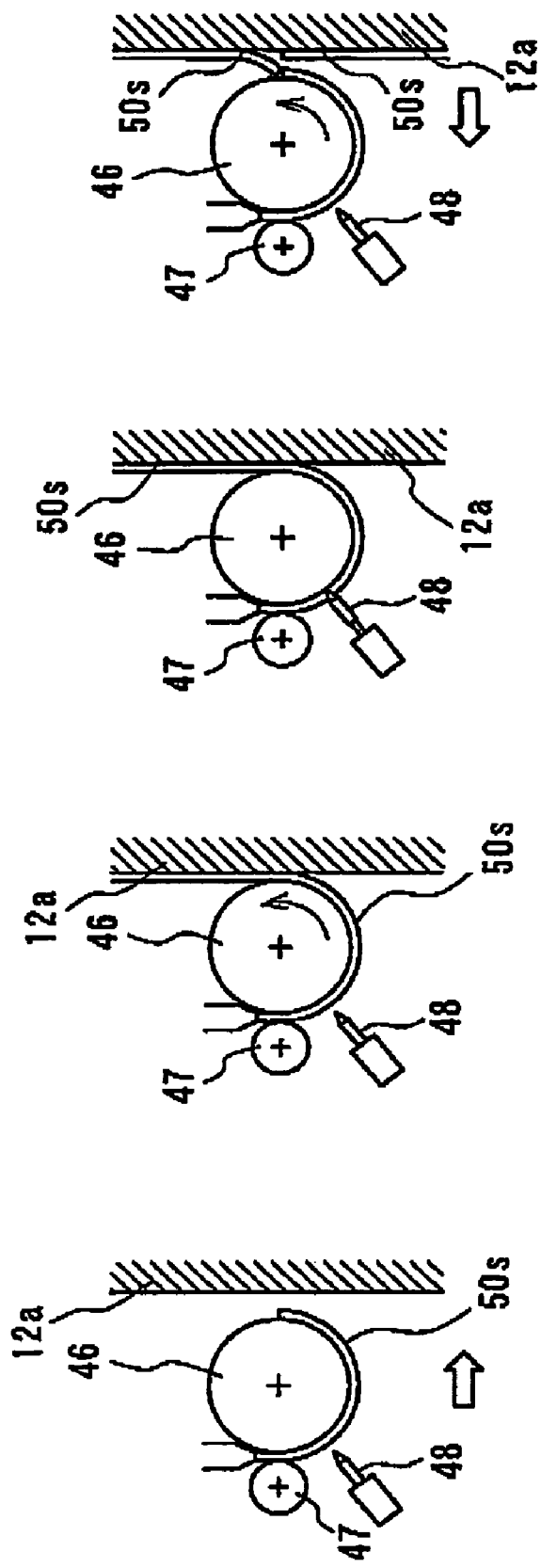
FIGS. 19(a) to 19(d) are diagrams for explaining a method of stamping a rubber sheet onto an annular band.

FIG. 19 is an explanatory diagram explaining a method of stamping the rubber sheet 50s on the annular band 12a using this cover rubber stamping device 40 and shows with the section corresponding to FIG. 17(b). FIG. 19(a) is a diagram showing the state immediately before beginning to wind the rubber sheet 50s, in which the tip end of the rubber sheet 50s is held on the circumference of the large roller 46 and the large roller 46 is stopped at the rotational position where the tip end of the rubber shoot 50s is the closest to the annular band 12a. After this state, the large roller 46 and the small roller 47 are made closer to the annular band 12a as shown by the arrow, and the tip end of the rubber sheet 50s is pressed onto the annular band 12a. Next as shown in FIG. 19(b), while the rubber sheet 50s is pressed between the large roller 46 and the annular band 12a, the large roller 46, the small roller 47 and the carcass member 18 are rotated in synchronization, and the rubber sheet 50s is wound onto the annular band 12a.

Figure 20:
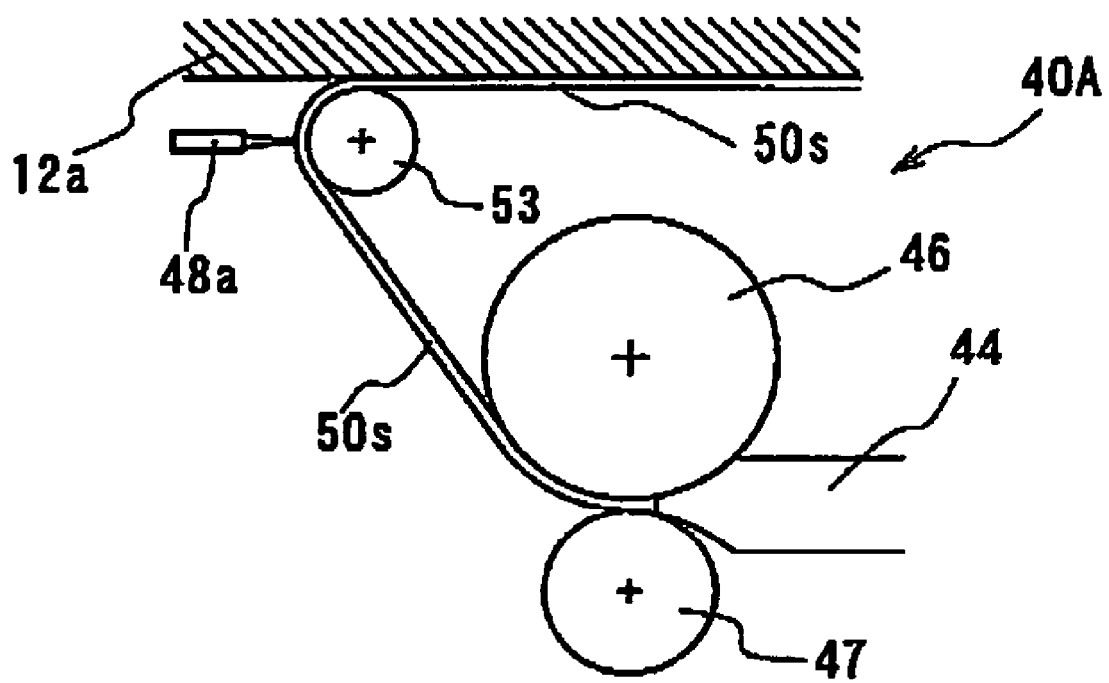
FIG. 20 is a partial sectional view showing a cover rubber stamping device provided with exclusive pressing rollers.

And as shown in FIG. 19(c), when coming closer to the end of the single winding cycle, a portion of the rubber sheet 50s on the large roller 46 corresponding to the rear end of one cycle is cut off using the cutter 48. The winding is resumed after that, but as shown in FIG. 19(d), at the stage where the tip end side of the cut-off portion approaches the annular band 12a, the large roller 6 is separated from the annular band 12a, and the large roller 46 is stopped at the rotation position exactly corresponding to FIG. 19(a). Moreover, when the carcass member 18 is slightly rotated, the rear end of the rubber sheet 50s is completely transferred onto the annular band 12a, and after the state shown in FIG. 19(d), by pressing the rear end of the rubber sheet 50s using another pressing roller or the like, the cover rubber 15 can be stamped. In this embodiment, the large roller 46 is provided with a pressing function to press the rubber sheet 50s onto the annular band 12a, but an exclusive pressing roller can be provided separately from the large roller 46, and FIG. 20 is a partial sectional view showing a cover rubber stamping device 40A provided with this exclusive pressing roller 53 shown on the section corresponding to FIG. 17(b). The rubber sheet 50s rolled between the truncated conical large roller 46 and the small roller 47 is wound around the exclusive pressing roller 53 and pressed between the exclusive pressing roller 53 and the annular band 12a at the same time so that the cover rubber 15 can be stamped. In this case, a cutter 48a for processing the leading end and the rear end of the rubber sheet 50s is provided for cutting off the rubber sheet 50s on the exclusive pressing roller 53.

As above, the preferred embodiments of the tire having characters or lines in color different from the surroundings on at least one of side wall parts, its manufacturing method and the device used in this manufacturing method have been described, but constitution of the cover rubber stamping method and the cover rubber stamping device mentioned in the explanation is not applied only to the cover rubber but it can also be applied when formation of an annular rubber member on the side face of a body of ration becomes necessary, and in that case, the above "cover rubber" may be replaced with "annular rubber member" and the "carcass member (on which the side wall rubber is stamped)" with "body of rotation." As an example to form the annular rubber member on the side face of the body of rotation, there can be such cases that it is preferable to form a side wall rubber with a single annular member due to manufacturing form or that a thin cover rubber is disposed on the entire surface of the outside of the side wall rubber formed by winding a rubber ribbon in plural turns.

INDUSTRIAL APPLICABILITY

As obvious from mentioned above, according to the present invention relating to a tire having characters or lines in color different from the surroundings on the side wall part, a large extruder for extruding the side wall rubber is not needed, size switching is easy and tires of another type can be manufactured efficiently, and also, shapes and dimensions of each member is highly accurate and tires with excellent uniformity and tire balance can be manufactured. Moreover, since the cover rubber is stamped by winding the rubber sheet in one turn, the profiles of the first color characters or lines appearing when formed by winding the rubber ribbon in plural turns can be made sharper and a problem in appearance can be prevented.

Also, with regard to the method and device of stamping the cover rubber in the annular state, this is not limited to stamping of the cover rubber but can be also applied to a side face of a general body of rotation, such a case where a rubber sheet is wound around a side face of a tire in one turn to form various types of annular rubber members, for example.

The invention claimed is:

1. A method of manufacturing a tire having, on at least one side wall, a first color side wall rubber expressed as characters or lines, second color side wall rubbers, each of which is located on both sides in the radial direction of this first color side wall rubber, and a second color cover rubber covering the first color side wall rubber portion other than the characters or lines, comprising:

winding a continuous second color rubber ribbon and a continuous first color rubber ribbon in plural turns to stamp each of the second color side wall rubbers and the first color side wall rubber on the side face of a carcass member formed in the toroidal state, winding a rubber sheet in one turn in the annular state to stamp said cover rubber on the outside of the first and second side wall rubbers by winding so as to shape a green tire, comprising the steps of:
- holding a leading end of a long rubber sheet arranged on a tangent of an annular band on the side wall rubber to be a stamping face of said cover rubber;
- moving and pressing the leading end onto the annular band;
- stamping the rubber sheet onto the annular band by rotating the carcass member around a central axis thereof while applying a tension to the rubber sheet;
- cutting off an unstamped portion of the long rubber sheet to form a rear end of the rubber sheet on the annular band and a leading end of a next rubber sheet; and
- pressing the formed rear end of the rubber sheet onto the annular band to stamp the cover rubber;
- vulcanizing the green tire, using a mold having a recess portion corresponding to the characters or lines, and forming a projecting portion corresponding to the recess portion on the tire, and
- after vulcanization, buffing the projecting portion on the tire to have the first color characters or lines to be expressed, wherein in cutting the long rubber sheet extending on said tangent to form the leading end and the rear end of said rubber sheet, both cut-off faces of the leading end and the rear end of the rubber sheet are inclined with respect to the width direction of the long sheet, and the long rubber sheet is cut off so that, in the cut-off face of the rubber sheet leading end, the end in the width direction to be the outside in the radial direction on the annular band is located closer to the front in a traveling direction of the long sheet than the end in a width direction to be an inside in the radial direction, while in the cut-off face of the rubber sheet rear end, the end in the width direction to be the outside in the radial direction on the annular band is located closer to the rear in the traveling direction of the long sheet than the end in the width direction to be the inside in the radial direction, and a rubber sheet portion in a shape of a trapezoid or a triangle defined by the cut-off face of the rear end of the rubber sheet stamped first and the cut-off face of the leading end of the rubber sheet to be stamped next is removed.

2. A method of manufacturing a tire having, on at least one side wall, a first color side wall rubber expressed as characters or lines, second color side wall rubbers, each of which is located on both sides in the radial direction of this first color side wall rubber, and a second color cover rubber covering the first color side wall rubber portion other than the characters or lines, comprising:
- winding a continuous second color rubber ribbon and a continuous first color rubber ribbon in plural turns to stamp each of the second color side wall rubbers and the first color side wall rubber on the side face of a carcass member formed in the toroidal state,
- winding a rubber sheet in one turn in the annular state to stamp said cover rubber on the outside of the first and second side wall rubbers by winding so as to shape a green tire,
- vulcanizing the green tire, using a mold having a recess portion corresponding to the characters or lines, and forming a projecting portion corresponding to the recess portion on the tire, and
- after vulcanization, buffing the projecting portion on the tire to have the first color characters or lines to be expressed, wherein, in stamping said cover rubber onto the annular band on the side wall to be the stamping face, the rubber sheet extruded through a die is passed through a gap formed by arranging large-diameter sides and small-diameter sides of a pair of truncated conical rollers opposite to each other and rolled, and immediately after rolling of this rubber sheet, the rubber sheet is stamped in the annular state so that the rubber sheet side rolled by the large-diameter side of truncated conical roller is made to correspond with the outside in the radial direction of the annular band while the side rolled by the small-diameter side of truncated conical roller is made to correspond with the inside in the annular band.

3. A method of manufacturing a tire according to claim 2, wherein said gap is made uniform over the width direction when rolling the rubber sheet.

4. A method of manufacturing a tire according to claim 2, wherein after the rolled rubber sheet is wound around one of the truncated conical rollers by a predetermined angle, the rubber sheet is transferred from this truncated conical roller to the annular band while pressing the wound rubber sheet onto the side face of the carcass member.

5. A method of manufacturing a tire according to claim 2, wherein the rubber sheet wound around said one of the truncated conical rollers is cut off in the width direction on this truncated conical roller.

* * * * *